US007836031B2

(12) United States Patent
Howard et al.

(10) Patent No.: US 7,836,031 B2
(45) Date of Patent: Nov. 16, 2010

(54) SYSTEMS AND METHODS FOR EMPLOYING A TRIGGER-BASED MECHANISM TO DETECT A DATABASE TABLE CHANGE AND REGISTERING TO RECEIVE NOTIFICATION OF THE CHANGE

(75) Inventors: Robert M. Howard, Snoqualmie, WA (US); Michael J. Pizzo, Bellevue, WA (US); Adam W. Smith, Redmond, WA (US); Pablo Castro, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 738 days.

(21) Appl. No.: 10/401,999

(22) Filed: Mar. 28, 2003

(65) Prior Publication Data

US 2004/0193653 A1 Sep. 30, 2004

(51) Int. Cl.
*G06F 7/00* (2006.01)
*G06F 17/00* (2006.01)
(52) U.S. Cl. .................. 707/702; 707/758; 707/769; 707/770
(58) Field of Classification Search .................. None
See application file for complete search history.

(56) References Cited

U.S. PATENT DOCUMENTS

| | | | | |
|---|---|---|---|---|
| 5,133,075 A * | 7/1992 | Risch | .................. | 707/201 |
| 5,418,943 A * | 5/1995 | Borgida et al. | .................. | 707/4 |
| 5,592,664 A * | 1/1997 | Starkey | .................. | 707/1 |
| 5,721,825 A * | 2/1998 | Lawson et al. | .................. | 709/203 |
| 5,826,253 A * | 10/1998 | Bredenberg | .................. | 707/2 |
| 5,940,820 A * | 8/1999 | Kagiwada | .................. | 707/3 |
| 6,026,413 A | 2/2000 | Challenger et al. | | |
| 6,256,712 B1 | 7/2001 | Challenger et al. | | |
| 6,434,554 B1 * | 8/2002 | Asami et al. | .................. | 707/4 |
| 6,442,541 B1 * | 8/2002 | Clark et al. | .................. | 707/3 |
| 6,567,809 B2 | 5/2003 | Santosuosso | | |
| 6,584,548 B1 * | 6/2003 | Bourne et al. | .................. | 711/134 |
| 6,732,360 B1 * | 5/2004 | Seo et al. | .................. | 719/310 |
| 6,799,208 B1 * | 9/2004 | Sankaranarayan et al. | .. | 709/223 |
| 6,910,070 B1 * | 6/2005 | Mishra et al. | .................. | 707/201 |
| 2002/0128897 A1 * | 9/2002 | Nelson et al. | .................. | 705/10 |

OTHER PUBLICATIONS

Paul H. Kim, Notification in the THOR Database System, May 24, 2002, 45 pages.*

(Continued)

*Primary Examiner*—Jay A Morrison
(74) *Attorney, Agent, or Firm*—Workman Nydegger

(57) ABSTRACT

The present invention relates to systems and methods for employing a trigger based mechanism to detect changes in a database table, providing a notification when the database table changes and registering to receive the notification. The systems and methods employ a listeners table to store information associated with registered database tables. Alter a database table changes, a trigger mechanism associated with the database change facilitates a search of the listeners table for a parameter associated with the changed database table. If the changed database table is registered, the information from the listeners table is provided to a delivery service which transmits a message indicating the registered database table changed. After receiving the message, a notification runtime service can route a notification to a client(s) registered to receive the notification. The foregoing mitigates performing time intensive queries and utilizing inconsistent query results.

72 Claims, 19 Drawing Sheets

OTHER PUBLICATIONS

J. Myers SMTP Service Extention for Authentication, Mar. 1999 RFC 2554.*

T. Berners-Lee et al. Hypertext Transfer Protocol Http/1.0 May 1996 p. 46-57.*

Wen-Syan Li, K. Selcuk Candan, Wang-Pin Hsiung, and Divyakant Agrawal. Web Accleration for E-Commerce Web Applications. Poster Proceedings of the 10th World Wide Web Conference pp. 166-167, 2001.

Krithi Ramamritham, Raju Sivasankaran, John A. Stankovic, Don T. Towsley, and Ming Xiong. Integrating Temporal, Real-Time, and Active Databases. SIGMOD Record vol. 25 No. 1, pp. 8-12, 1996.

Eric N. Hanson, Chris Carnes, Lan Huang, Mohan Konyala, Lloyd Noronha, Sashi Parthasarathy, J.B. Park, Albert Vernon. Scalable Trigger Processing. Proceedings of the 15th International Conference on Data Engineering, pp. 266-275, 1999.

Kapali P. Eswaran. Aspects of a Trigger Subsystem in an Integrated Database System. Proceedings of the 2nd International Conference on Software Engineering, pp. 243-250, 1976.

* cited by examiner

LISTENERS TABLE — 200

| 1,1 | ... | 1,N |
| M,1 | ... | M,N |

FIG. 2

LISTENERS TABLE — 300

| TABLE ID | CLIENT ID | |
|---|---|---|
| TABLE NAME | REGISTRATION ID | DELIVERY ADDRESS |
| 360 | 370 | 380 |

340, 350, 310, 320, 330 DATA AREA

FIG. 3

SYSTEMS AND METHODS FOR EMPLOYING A TRIGGER-BASED MECHANISM TO DETECT A DATABASE TABLE CHANGE AND REGISTERING TO RECEIVE NOTIFICATION OF THE CHANGE

TECHNICAL FIELD

The present invention relates generally to databases, and more particularly to systems and methods for detecting changes in a database table, providing a notification when the database table changes and registering to receive the database table change notification.

BACKGROUND OF THE INVENTION

Computing and networking technologies have transformed many important aspects of everyday life. Computers have become a household staple instead of a luxury, educational tool and/or entertainment center, and provide users with a tool to manage and forecast finances, control household operations like heating, cooling, lighting and security, and store records and images in a permanent and reliable medium. Networking technologies like the Internet provide users with virtually unlimited access to remote systems, information and associated applications.

As computing and networking technologies become robust, secure and reliable, more consumers, wholesalers, retailers, entrepreneurs, educational institutions and the like are shifting paradigms and employing the Internet to perform business instead of the traditional means. For example, many businesses and consumers are providing web sites and/or on-line services. For example, today a consumer can access his/her account via the Internet and perform a growing number of available transactions such as balance inquiries, funds transfers and bill payment.

In addition, computing and networking technologies have been integrated within educational systems. Educational institutions as early as elementary school are developing and nurturing computer literate students and encouraging the students to employ the Internet as a research and informational tool. Many students today cannot conceive of a world without the Internet.

Typically, an Internet session includes a user interfacing with a client application (e.g., a web page) to interact with a server that stores information in a database that is accessible to the client application. For example, a stock market web site can provide the user with tools for retrieving stock quotes and purchasing stock. The user can type in a stock symbol and request a stock quote by performing a mouse click to activate a query. The client application queries a database table(s) of stocks and returns a stock quote.

One shortcoming of computing and networking technologies is the limited bandwidth. For example, a user consumes a portion of the available bandwidth, which reduces the bandwidth accessible to other users. As more and more users consume the available bandwidth, system response time and/or performance can diminish. Another shortcoming of computing and networking technologies is the limited available data transfer rates relative to the quantity of data available. For example, requests that retrieve large amounts of data (e.g., distributed across various servers) can be time intensive, which can diminish performance.

The aforementioned shortcomings are compounded by users performing frequent and similar requests. For example, a user desiring current stock quotes may perform frequent similar requests to obtain an updated stock quote. Thus, the user frequently consumes bandwidth and performs queries that retrieve substantially similar information. In addition, other users can concurrently perform requests that retrieve substantially similar information. The user(s) is further limited in that the consistency of the retrieved data cannot be guaranteed because the returned results can become invalid after a subsequent database table change.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to systems and methods for employing a trigger based mechanism to detect changes in a database table, providing a notification when the database table changes and registering to receive the notification. The foregoing provides a technique to monitor a dynamic database table for changes via registering the database table and receiving a change notification when the registered database table changes.

Generally, a client request initiates a database query to retrieve data from a database table to fulfill the request. In many instances, the database can become a common source of resource contention. For example, more than one user can transmit a similar request that concurrently queries the database and returns similar results. Such concurrent querying for similar results can increase database load, reduce bandwidth, diminish performance and consume resources, for example. In another example, one or more users can frequently perform similar requests. Likewise, system performance can be reduced, for example. The database, under the foregoing examples, represents a state that is shared amongst a plurality of similar requests. When the plurality of similar requests occurs concurrently, the shared state can become a source of state and/or resource contention which can limit system performance and scalability. A technique typically employed to reduce the number of queries comprises saving frequently utilized results (e.g., raw data, transformed data, and queryable data results, and/or an object) externally from the database, and then utilizing the saved results instead of performing a similar query. However, the consistency of the saved data is compromised because a subsequent database table change can occur to render the saved results inconsistent with the database table without the client being apprised.

The systems and methods of the present invention mitigate database load (e.g., reduce the number of queries that return similar results), increase scalability, and ensure consistent results. For example, a client can register a database table in order to receive notification when the database table changes. The client can then perform a query, save the results in high-speed memory and utilize the saved results instead of performing an additional query and/or utilize a portion of the saved results and reduce a subsequent query, thus mitigating querying for substantially similar results. Additionally, other clients can register the database and utilize the saved results, mitigating performing queries via a plurality of clients for similar results. When a database table change occurs, the client(s) receives a notification indicating that the saved result(s) is inconsistent. The client(s) can utilize the notification to invalidate the saved results, perform a query to refresh the saved results and/or ignore the notification, for example.

Furthermore, the present invention includes systems and methods that detect a database table change, to provide a notification indicating the change, to register a database table to be monitored for changes and to receive a database table change notification that can be employed concurrently. Generally, registering to receive a database table change notification comprises providing database table information to the detection system. The database table registration information is typically stored in a table associated with the detection system. After a database table change, the detection system searches the table for the change to determine whether to transmit a database table change message. The message provides routing and database table information, which is forwarded to clients that registered to receive a notification when the database table changed.

The systems and methods employ a listeners table to store information pertaining to registered database tables, at least one database table with a trigger mechanism that is invoked when a database table change occurs, a notification delivery service to provide a message indicating the database table change occurred, a notification runtime service that facilitates assembling registration information and provides a notification after receiving a database table change message from the notification delivery service, and a registration component to assemble registration information and provide the registration information to the listeners table.

The systems and methods can be employed in various environments. For example, the invention can be employed in a client-server environment. Thus, the present invention provides a means for a client(s) to monitor a database table(s) for changes and to be notified when the database table(s) changes. The foregoing can be advantageous when the client(s) is utilizing saved data retrieved from a database table(s) and/or when the client desires current information. Examples of suitable client-server environments include environments based on SQL. Furthermore, existing architectures can be leveraged for security, reliability and scalability, and provide a familiar programming environment. Moreover, the registration techniques mitigate overhead associated with configuring the client-server prior to the client registering the database table.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIG. 2 illustrates a first exemplary listeners table in accordance with one aspect of the present invention.

FIG. 3 illustrates a second exemplary listeners table in accordance with one aspect of the present invention.

DETAILED DESCRIPTION OF THE INVENTION

Figure 1:
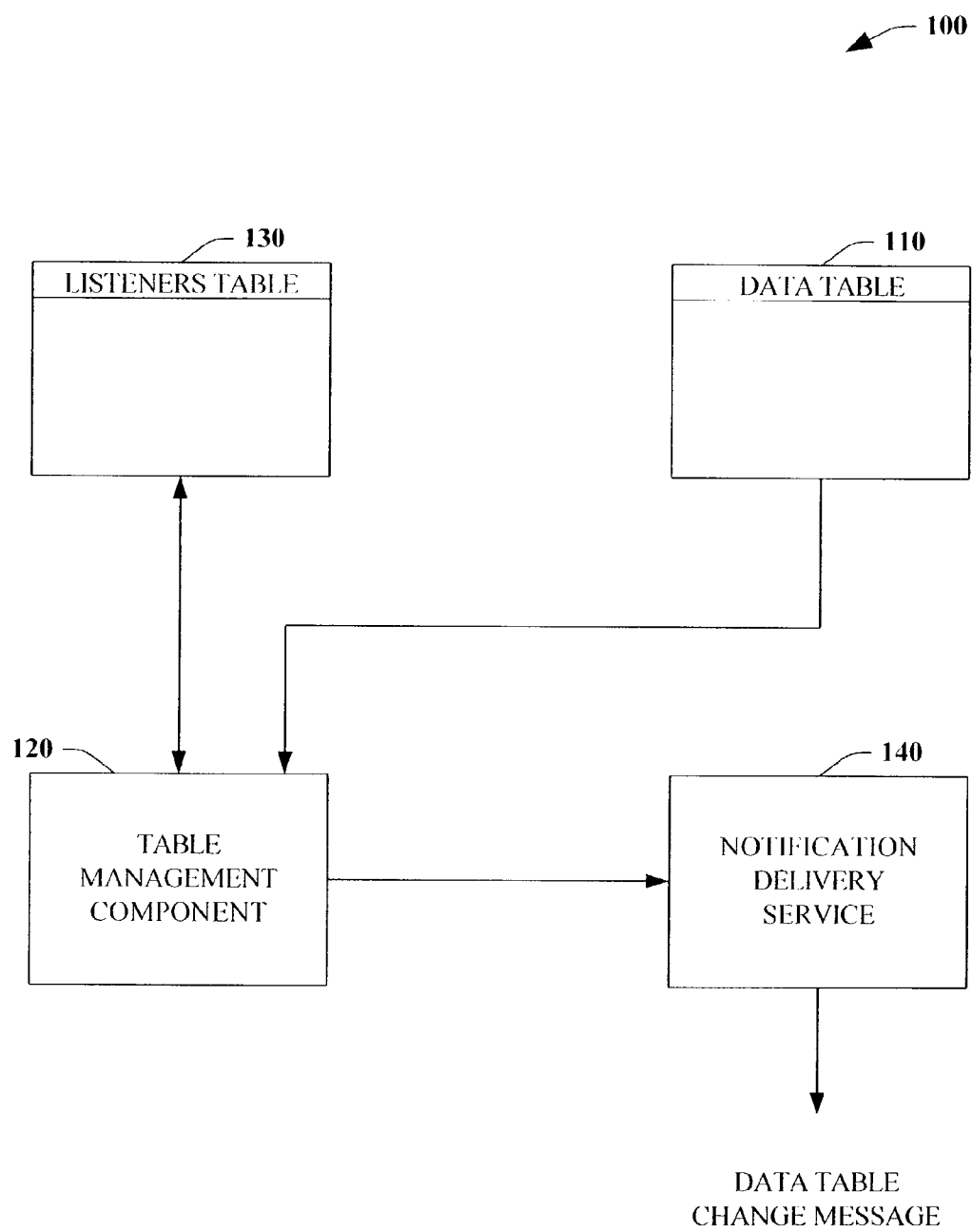
FIG. 1 illustrates an exemplary data table change detection and notification system in accordance with one aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers. A "thread" is the entity within a process that the operating system kernel schedules for execution. As is well known in the art, each thread has an associated "context" which is the volatile data associated with the execution of the thread. A thread's context includes the contents of system registers and the virtual address belonging to the thread's process. Thus, the actual data comprising a thread's context varies as it executes.

The present invention relates to systems and methods that employ a trigger based mechanism to detect changes in a database table, that provide a notification when the database table changes and that register to receive the notification. Generally, the systems and methods employ a detection and messaging means, a registration means and/or a notification means.

The detection and messaging means can include at least one database data table, a listeners table and a notification delivery service. The at least one data table is typically associated with a trigger that is invoked when the database table changes. The trigger initiates a subsequent search of the listeners table. The listeners table stores information related to registered database tables. If registration information associated with the changed data table is located in the listeners table, then the notification delivery service provides a message indicating the database table changed. The registration means facilitates assembling the database table registration information to include the listeners table and provides the registration information to the listeners table. The notification means facilitates receiving a database table change message from the notification delivery service and routes a notification to a client registered to receive the notification.

Typically, the systems and methods are employed in a client-server environment. Thus, a client(s) employing cache or other high-speed memory to save and employ frequently utilized data (e.g., raw transformed, and queryable results) from a database table query can register the database table in a listeners table. Additionally, other clients querying for similar results can register the database and utilize the saved results. After the registered database table, which is referenced in and/or associated with the listeners table, changes, a notification delivery service provides a database table change message to a notification runtime service. Subsequently, the notification runtime service notifies the client(s) that the registered database table changed, rendering the saved query results inconsistent. Thereafter, the client(s) can utilize the notification to invalidate the cached data, perform a query to refresh the cached data and/or ignore the message, for example.

Referring to FIG. 1, an exemplary data table change detection and notification system 100 in accordance with an aspect of the present invention is illustrated. The data table change detection and notification system 100 comprises a data table 110 (e.g., database table and database data table), a table management component 120 to facilitate cooperation amongst the data table 110, a listeners table and a notification delivery service, a listeners table 130 for storing registration information related to a registered data table and a notification delivery service 140 to provide a message indicating a registered data table changed.

The data table 110 comprises a trigger mechanism (not shown) that invokes the table management component 120 when the data table 110 has changed. Typically, invocation of the table management component 120 includes providing a data table parameter(s) such as the data table name and/or identification, for example. The trigger can reside within the data table 110, wherein the trigger invokes the table management component 120 when at least one data table changes. It should be appreciated that a plurality of triggers can be tied to a plurality of respective data tables. The plurality of triggers can employ a similar routine (e.g., stored procedure) such that the routine comprises the logic for looking up the table in the listeners table 130 and for invoking the notification delivery service 140.

After invocation, the table management component 120 facilitates searching the listeners table 130 to detect whether registration information for the changed data table is in the listeners table 130, and subsequently provides the registration information to the notification delivery service 140. For example, the table management component 120 can employ a method, function, routine and/or procedure (e.g., a stored procedure), which utilizes the data table parameter(s) to search the listeners table 130 for registration information associated with the data table parameter. If an entry(s) is detected in the listeners table 130, then the corresponding registration information in the listeners table 130 can be provided to the notification delivery service 140 via the table management component 120.

The listeners table 130 comprises storage space wherein registration information is saved. Exemplary listeners tables are described in detail below in conjunction with FIGS. 2 and 3. The registration information typically includes data table identification to locate changed data tables, and client identification and location to route a message to the client(s) when a data table change occurs.

As noted above, the listeners table 130 is searched when a data table changes and a data table trigger invokes the table management component 120. Searching can include scrutinizing the listeners table 130 cell-by-cell, row-by-row, column-by-column and/or any combination thereof. In one aspect of the present invention, the registration information can be removed from the listeners table 130 concurrently with and/or subsequently to providing the registration information to the notification delivery service 140. In another aspect of the present invention, the registration information is provided to the notification delivery service 140 and sustained in the listener table 130. The registration information can remain in the listener table 130 until removed by a client, a timeout occurs, and/or an event (e.g., an error) occurs, for example.

The notification delivery service 140 provides a data table change message indicating that the registered data table has changed. The data change message typically includes at least a portion of the registration information, and can be utilized to notify a client(s) that returned and/or saved results (e.g., raw, transformed and queryable) have become inconsistent, to trigger a refresh of data within a grid, discard data, to initiate additional processing, and to alert a user(s) to perform an action, for example.

It is to be appreciated that the system 100 can employ a plurality of data tables, wherein a client can register one or more of the plurality of data tables, as described above. Furthermore, a plurality of clients can register one or more data tables, including similar data tables. Thus, the listeners table 130 can include more than one entry associated with a similar data table. When the similar data table changes, the notification delivery service 140 can be invoked more than once, for example by each of the more than one entry. In addition, a data table change to a registered data table will elicit a data table change message to notify any client(s) associated with the registered data table and/or associated query results that changed.

While FIG. 1 is a block diagram illustrating components for the system 100, it is to be appreciated that the data table 110, the table management component 120, the listeners table 130 and the notification delivery service 140 can be implemented as one or more computer components, as that term is defined herein. Thus, it is to be appreciated that computer executable components operable to implement the system 100, the data table 110, the table management component 120, the listeners table 130 and the notification delivery service 140 can be stored on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the present invention.

FIGS. 2 and 3 illustrate exemplary listeners tables in accordance with an aspect of the present invention. It is noted that the exemplary listeners tables are provided for explanatory purposes and do not limit the invention. For example, suitable listeners tables can have more or less fields and/or cells than described below. In addition, a field can be variously positioned relative to another field. Moreover, the listeners table can be represented as a multi-dimensional matrix, an array, a record, a structure and the like.

Proceeding to FIG. 2, an exemplary listeners table 200 is illustrated in accordance with an aspect of the present invention. The listeners table 200 comprises a two-dimensional matrix of N columns and M rows, where N and M are integers equal to or greater than one. As noted previously, the listeners table 200 stores data table registration information.

Registration information can be stored row-wise and/or column-wise within the listeners table 200. In addition, the information can be parsed across fields and/or stored as a string wherein parsing of the registration information occurs within and/or outside of listeners table 200. For example, in one aspect of the present invention a copy of tile registration information string can be translated and/or interpreted during searching for registration information associated with a changed data table. The copy and/or original registration information can then be provided to the notification delivery service if a match is detected. Then, the notification delivery service can parse the registration information string and provide at least portion of the registration information in a message.

In another aspect to the present invention, the registration information can be encoded and/or encrypted prior to being stored in the listeners table 200 to mitigate security concerns, for example malicious code (e.g., viruses) intended to disrupt performance via simulating a change to a data table has occurred when the data table has not changed. Suitable techniques for decoding and/or decrypting can then be employed during searching and/or data table change message transmission.

FIG. 3 illustrates an exemplary listeners table 300 in accordance with an aspect of the present invention. The listeners table 300 comprises a field row 310 a sub-field row 320 and an associated data area 330. As discussed above, a listeners table can store registered data table information. For example, a data table name, a registration identification (ID) and a delivery address can be stored.

The field row 310 comprises a table identification (ID) field 340 and a client identification (ID) field 350. The table ID field 340 comprises a table name sub-field 360 associated with a portion of the data area 330. The client ID field 350 comprises a registration ID sub-field 370 and a delivery address sub-field 380, wherein the sub-fields 370 and 380 store information within the portion of the data area 330 associated with the client ID field 350.

Registration information can be stored within the listeners table 300 as individual and/or combined entries. In one aspect of the present invention, a row can be an individual entry wherein the row stores the registration information. In another aspect of the invention, a data table can be associated with one or more clients, and a row can be an entry for the data table and one client, wherein a row can be linked with another row to group the one or more clients with the data table. In yet another aspect of the invention, a data table can be associated with a one or more clients, and the listeners table 300 can further comprise more than one client ID field 350, wherein the data table and the one or more clients can be stored in a row with individual client information stored within a respective client ID field in the row. Still in another aspect of the invention, a client can be associated with a one or more data tables, wherein the aforementioned groupings can be employed to group data tables with a client.

It is to be appreciated that the foregoing example is provided for explanatory purposes and does not limit the invention. The listeners table 300 can further comprise additional and/or different entries. For example, the registration information can include other information such as protocol, authentication mode, a call to one of a plurality of notification delivery services registration information removal criteria (e.g., remove after a data table change, retain until a client removes, remove after a timeout expires, and remove after an event (e.g., an error) occurs), for example. It is to be appreciated that the listeners table 300 can further include substantially all and/or a portion of the registration information, as well as other information, for example information provided by a server and/or the listeners table (e.g., to facilitate storage and retrieval).

Figure 4:
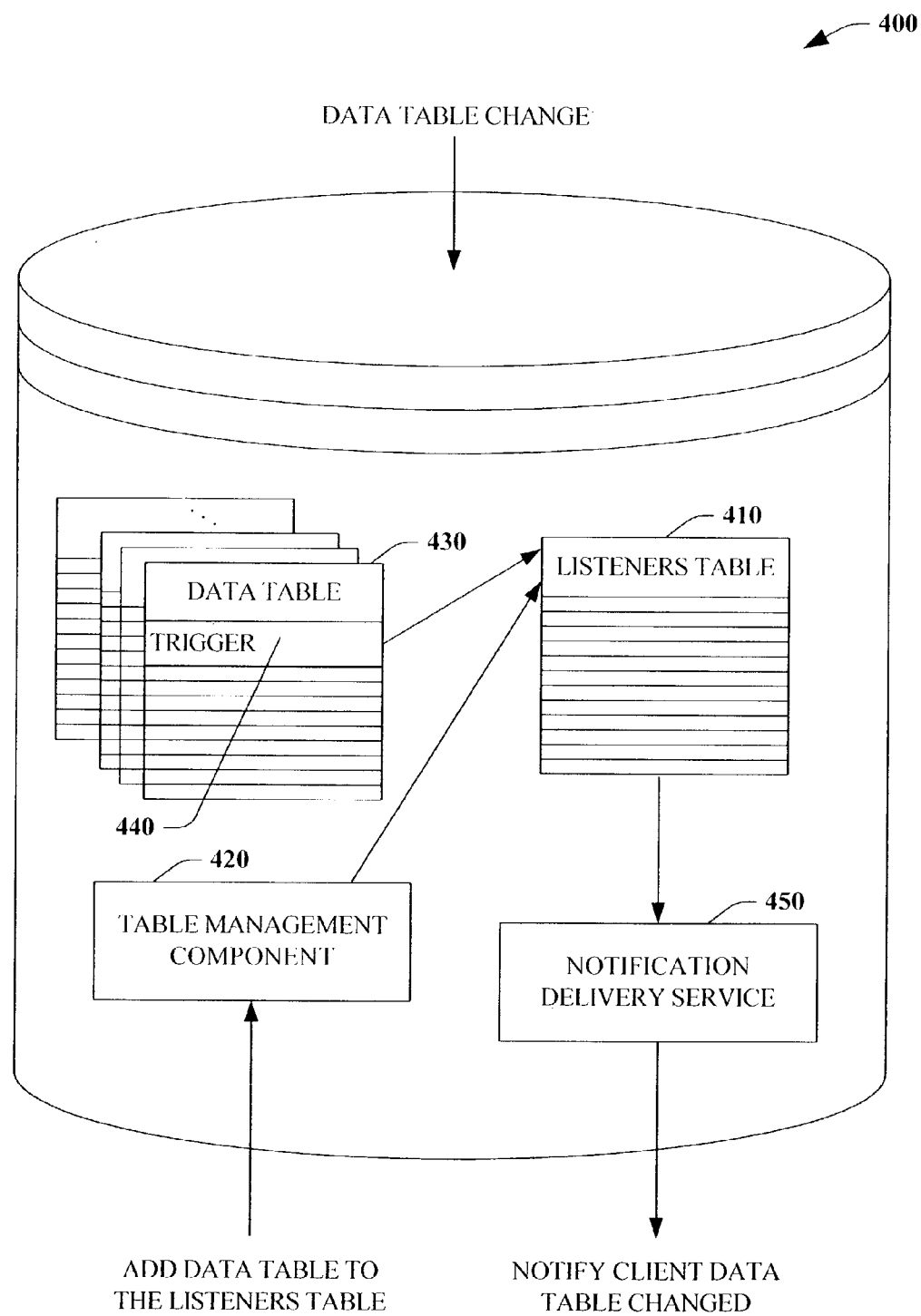
FIG. 4 illustrates an exemplary server in accordance with one aspect of the present invention.

Proceeding now to FIG. 4, an exemplary server 400 is illustrated in accordance with an aspect of the present invention. The server 400 comprises a listeners table 410, a table management component 420, a plurality of data tables (hereafter data tables) 430 with at least one trigger 440, and a notification delivery service 450. The server 400 can be a Structured Query Language (SQL,) server, for example, and operatively coupled to a registration component and/or a notification runtime service, as described below.

The listeners table 410 can be employed to store information corresponding to a client and a registered data table, as described above. For example, the exemplary listeners tables depicted with FIGS. 2-3 can be employed with the system 400. However, it is noted that various other listeners tables and information can be utilized.

Information can be added to the listeners table 410 via the table management component 420. Generally, an add data table to the listeners table request is provided to the table management component 420 by a client, for example, to register a data table. The table management component 420 then provides the registration information to the listeners table 410. It is to be appreciated that other techniques can be employed to provide registration information to the listeners table 410. For example, information can be included (e.g., adding a row) in the listeners table 410 without employing the table management component 420.

The data tables 430 comprise data that clients can retrieve through querying the system 400. Clients can perform various queries to retrieve portions and/or substantially all of the data, including repetitive and/or concurrent queries wherein similar data is retrieved. The data tables 430 are dynamic in that at least one data table can change. Generally, a data table change invokes the trigger 440 associated with the data table that facilitates searching the listeners table 410 for associated registration information. Searching includes detecting whether registration information associated with the changed data tables is stored in the listeners table 410. A match in the listeners table 410 indicates that a client registered the data table, wherein the client registered to be notified that the data table changed. If a match exists in the listeners table 410, the registration information can be removed and/or retained (e.g., until a client removes, a time out expires and other event occurs) from the listeners table 410, and provided to the notification delivery service 450. The notification delivery service 450 can then provide a message with at least a portion of the registration information to indicate the data table changed.

The server 400 can be employed with a client application. The client application can form an association with one of more data tables 430 via registering with the listeners table 410. When a data table change occurs for at least one of the registered data tables 430, the data table trigger 440 associated with the data table that changed initiates a search of the listeners table 410, wherein the registration information associated with the detected data table registration information can be provided to the notification delivery service 450. Subsequently, the notification delivery service 450 can provide a data table change message, which can be utilized to locate and notify the client. The client application can then invalidate query results stored in memory and/or performing a query to refresh the results stored in memory. It is to be appreciated that a client(s) can register one or more data tables, and the results of querying the one or more data tables can be associated such that a change to any one of the data tables invokes a change message to the client(s) that can be utilized to invalidate the results from querying the data table that changed and/or the results from another data table(s) associated with the results from querying the data table that changed.

Figure 5:
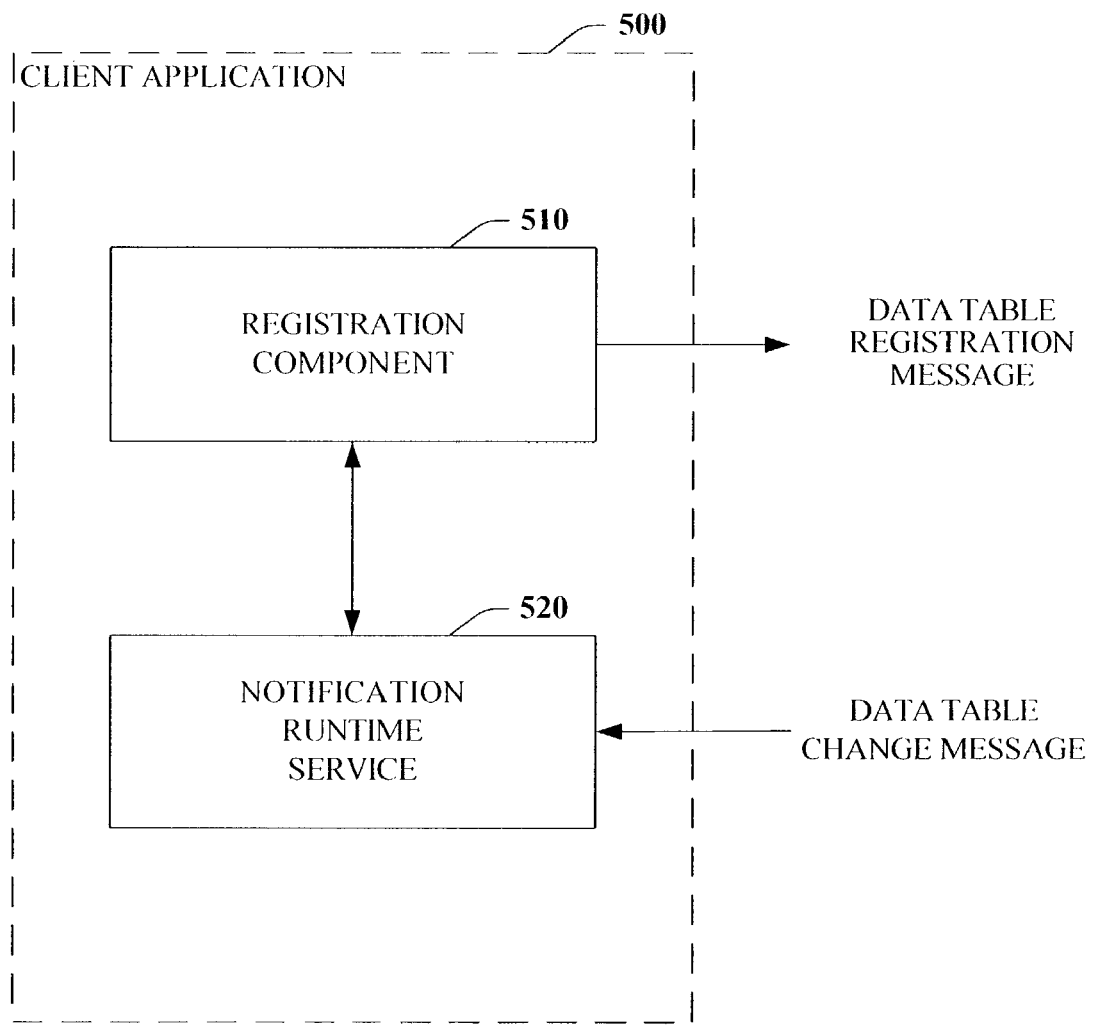
FIG. 5 illustrates an exemplary client in accordance with one aspect of the present invention.

Proceeding to FIG. 5, an exemplary client application 500 in accordance with an aspect of the present invention is illustrated. The client application 500 comprises a registration component 510 to facilitate data table registration and a notification runtime service 520 operative with the registration component 510. The notification runtime service 520 can provide registration information and a table change notification to the registration component 510.

Generally, the registration component 510 is activated when the client application 500 transmits a request to register a database data table in order to receive a notification when the associated data table changes. For example, the client application 500 can instantiate an object and provide the object with the data table name, and/or an optional connection via a constructor and/or a method (e.g., a function and a procedure).

After receiving the request, the registration component 510 registers with the notification runtime service 520. The notification runtime service 520 provides the registration component 510 with the delivery address, or the address of the notification runtime service 520. The registration component 510 then facilitates assembly and transmission of a data table registration message. The registration message comprises at least the data table name and the notification runtime service address. In one aspect of the present invention, the optional connection can be employed to transmit the registration message to a database for inclusion in a listeners table, wherein the connection facilitates determining the database to transmit the registration message to when a plurality of databases are utilized. In another aspect of the present invention, a connection may not be provided and a database name, a database ID, a global context and/or other type of database identifier, for example, can be employed to determine which database will receive the registration message.

The notification runtime service 520 can additionally receive a data table change message(s), and then notify the client application that a registered data table has changed. For example, after the notification runtime service 520 receives a data table change message, the data table change message is routed to the registration component 510 which can raise an event to inform the client application that a registered data table changed and/or set a flag for subsequent object instances, wherein an event is raised when the object instance requests registration of the data table. In addition, a client(s) can check the flag to determine whether a change has occurred, for example prior to utilizing saved results.

Figure 6:
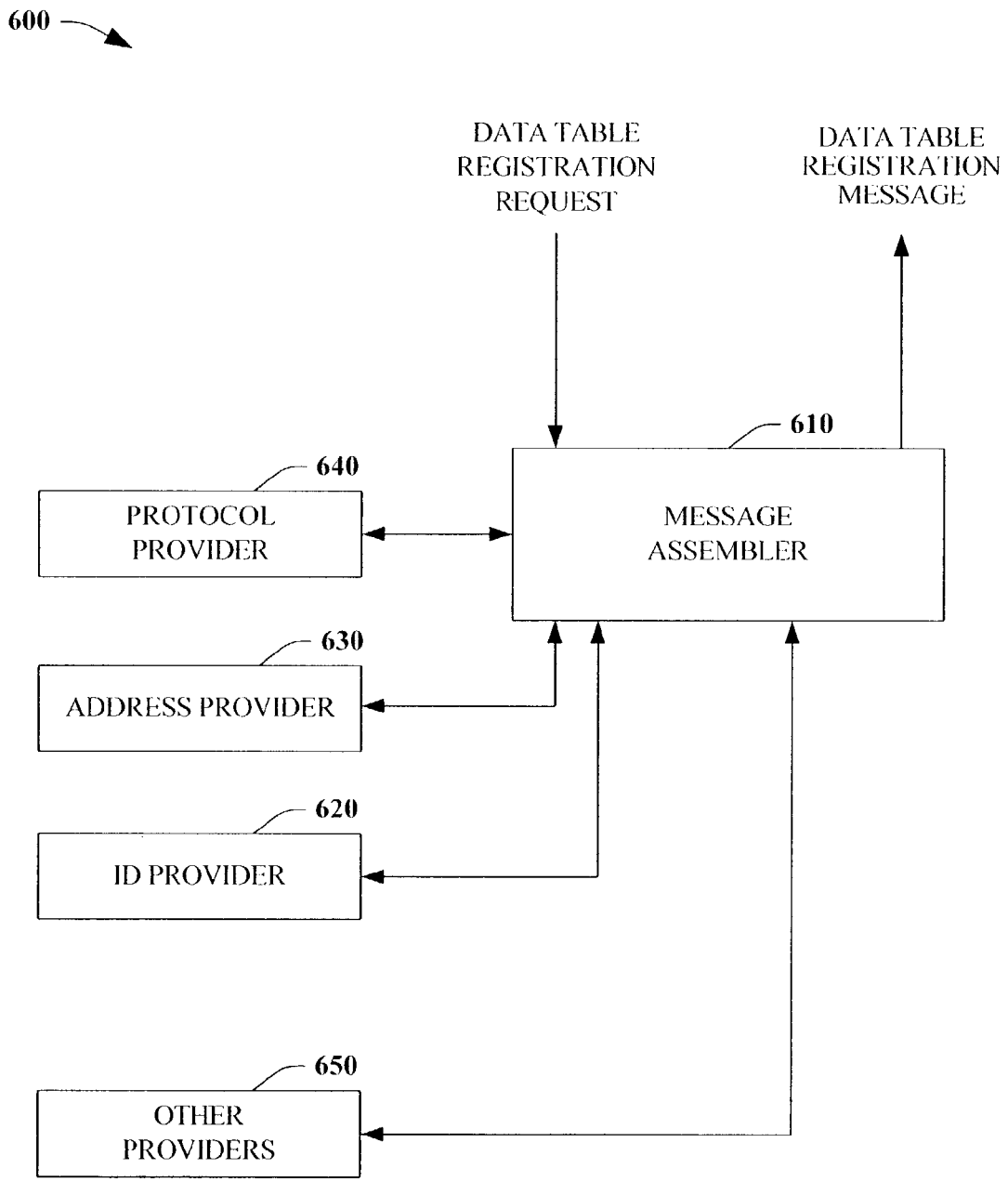
FIG. 6 illustrates an exemplary registration component in accordance with one aspect of the present invention.

FIG. 6 illustrates an exemplary registration component 600 in accordance with as aspect of the present invention. The registration component 600 can be employed to facilitate registration of a data table in a listeners table. The registration component 600 comprises a message assembler 610 to accept registration requests, coordinate packaging registration information and deliver the registration message to a system such as the data table change detection and notification systems 100 and 300, wherein the registration message provides the registration information to store in the listeners table. The registration component 600 further comprises an ID provider 620, an address provider 630 and a protocol provider 640, and optionally a plurality of other providers 650 (e.g., for the additional registration information noted above) to include in the data table registration message.

The message assembler 610 receives a data table registration request, for example from a client requesting the monitoring of a data table for changes and notification if a change occurs. The request typically includes at least the data table name. The message assembler 610 retrieves an ID from the ID provider 620, a routing address from the address provider 630, a protocol from the protocol provider 640, and optionally other information from the providers 650. The assembler 610 then facilitates constructing a registration message comprising, for example, the data table name, the ID, the routing address and the protocol, and transmits a data table registration message.

Figure 7:
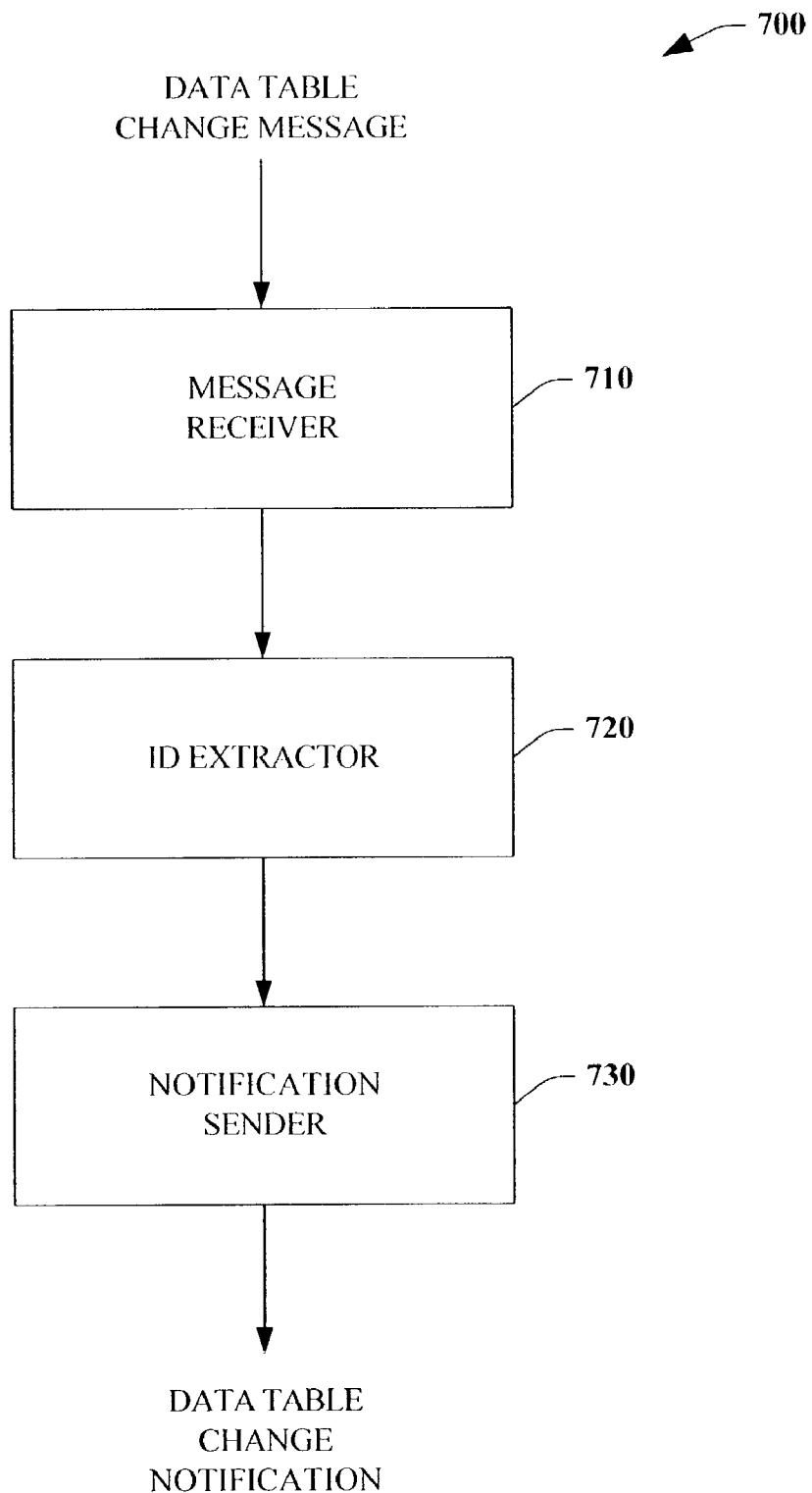
FIG. 7 illustrates an exemplary notification service in accordance with one aspect of the present invention.

FIG. 7 illustrates an exemplary notification runtime service 700 in accordance with an aspect of the present invention. The notification runtime service 700 comprises a message receiver 710, a ID extractor 720 and a notification sender 730.

The message receiver 710 accepts data table change message transmitted via a notification delivery service, for example. The message receiver 710 can employ various security and validation techniques to mitigate forwarding erroneous database change messages. For example, authentication certificates can be employed in accordance with an aspect of the present invention.

The message receiver 710 provides the database change message to the ID extractor 720. The ID extractor 720 obtains the unique identifier from within the database registration message. The unique identifier is then utilized by the notification sender 730 to route a notification to the component registered to receive the notification. For example, in one aspect of the present invention any client that is associated with the registration instance assigned the unique identifier is provided with a notification (e.g., an event). In another aspect of the present invention, a flag and/or other descriptor is employed to notify any client that attempts to register the database that the database has changed.

Figure 8:
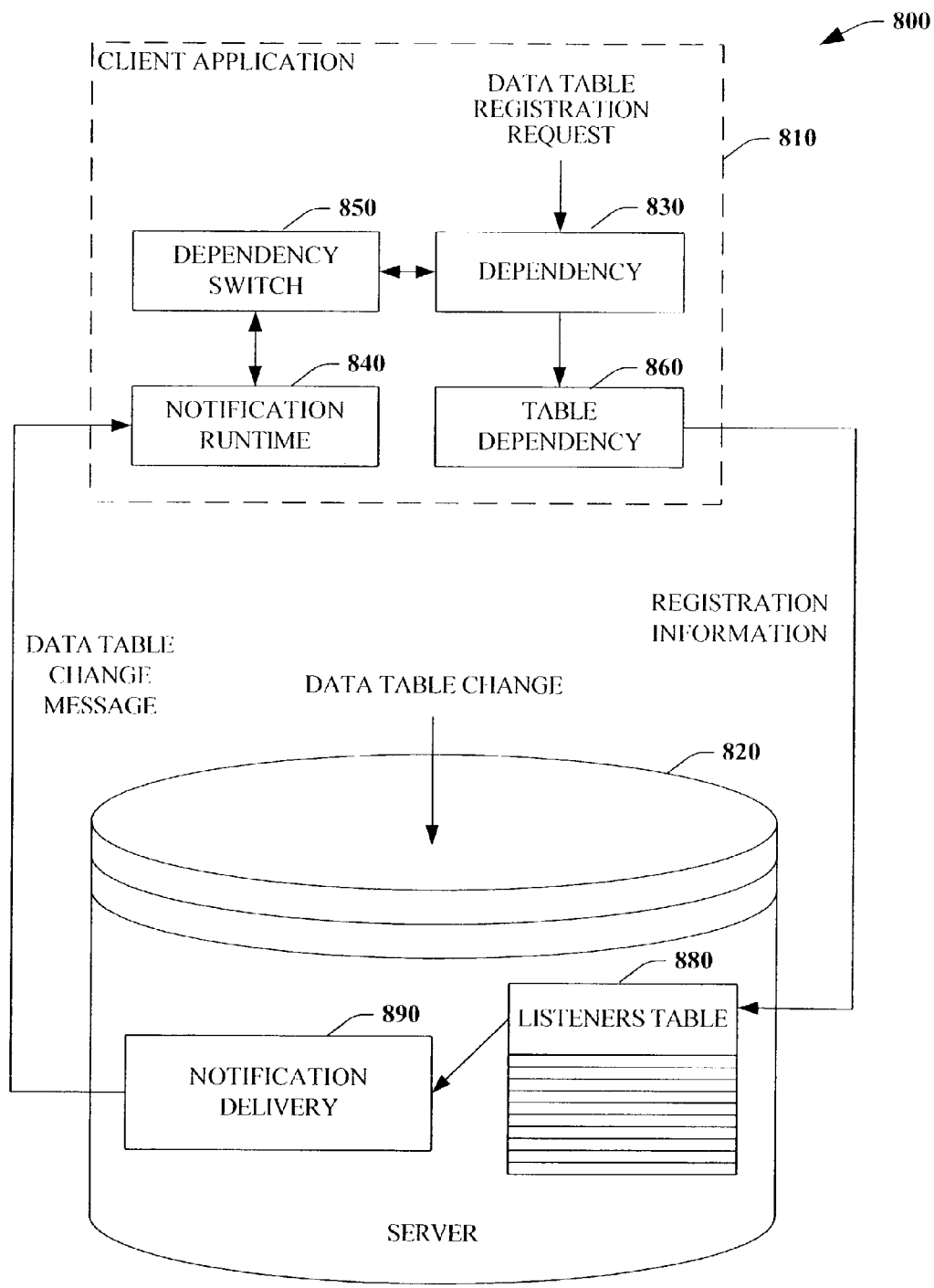
FIG. 8 illustrates a first exemplary client-server in accordance with one aspect of the present invention.

FIG. 8 illustrates a client-server-system 800 in accordance with an aspect of the present invention. The client-server system 800 comprises a client application 810 and a server 820 wherein the client application 810 can register a data table (not shown) in a listeners table in order to be notified when the data table in the server changes.

It is to be appreciated that the client application system 800 can comprise various components and/or services including components and services similar to those described above associated with a client, application and/or component. In addition, more than one client application can be employed with the system 800. However, for brevity the following describes the client application 810. Likewise, the server 820 can comprise various components and/or services including components and services similar to those described above to those associated with servers and/or databases. Moreover, the client-server system 800 can be an SQL based system and the like.

The client application 810 comprises a dependency component 830, an optional dependency switch 850, a notification runtime service 840 and a table dependency component 860 operatively coupled to the server 820 to register the data table. The client application 810 facilitates registration of a data table after receiving a data table registration request. For example, the client application 810 can instantiate a dependency object wherein a constructor is passed parameters such as a connection, a connection string and an identifier. In another aspect of the present invention, constructor parameters are not submitted, and a method (e.g., function and procedure) provides connection information.

The dependency component 830 additionally provides a unique identifier, for example a globally unique identifier (GUID) or other identifier, for the request and utilizes the identifier to register with the notification runtime service 840. The dependency component 830 can register through an optional dependency switch 850. If the optional dependency switch 850 is active, then the dependency component 830 provides the identifier and registers with the optional dependency switch 850. If the notification runtime 840 is active, the optional dependency switch 850 provides the identifier and registers with the notification runtime service 840. If the optional dependency switch 850 and/or the notification runtime service 840 are not active, the dependency component 830 will start the optional dependency switch 850 and the notification runtime service 840. It is to be appreciated that the optional dependency switch 850 can be employed to mitigate cross-boundary channels in the client application 810 via providing a channel between a process and optional dependency switch 850, and between the optional dependency switch 850 and the notification runtime service 840. However, when the optional dependency switch 850 is not employed, the dependency component 830 can register with the notification runtime service 840 without prior registration with an intermediate component such as the optional dependency switch 850, for example.

After registration, the notification runtime service 840 provides a delivery address to the dependency component 830, and the data table name and connection are provided to the table dependency component 860. The table dependency component 860 then provides at least the data table name, the delivery address and the unique identifier to the sever 820. It is to be appreciated that the dependency component 830 and the table dependency component 860 can be a single component. However, delineating functionality between the components 830 and 860 facilitates re-usability of the dependency component 830 for other data table registrations, for example.

The server 820 comprises a listeners table 880 to store registered data table information and a notification delivery service 890 to provide a data table change message when a registered data table changes. Generally, the registration information transmitted by the table dependency 860 is inserted into the listeners table 880. A subsequent data table change invokes a trigger (not shown) associated with the data table (not shown). The trigger can be similar to the trigger described above, for example. The trigger facilitates a search of the listeners table 880 for an associated data table registration information. If a match is found, then the associated registration information is provided to the notification delivery service 890.

The notification delivery service 890 employs at least a portion of the information in a message, and provides the message to the notification runtime service 840 of the client application 810. The notification runtime service 840 utilizes the information to inform the client application 810 that the data table has changed. In addition, other information such as the type of database change (e.g., insert, update, and delete) and/or reason for notification (e.g., data changed, time out expired, memory full and system boot) as well as content (e.g., original and current values) can be transmitted to the client.

It is to be appreciated that the client application, system 800 can further comprise a dependency listener (not shown), and alternatively register with a universal listener (not shown) to receive a notification when a database table changes. For example, the client application 810 can instantiate the dependency component 830 and create the unique identifier, as described above. The dependency component 830 can then provide the unique identifier to the dependency listener. The dependency listener generates a unique URI to register with the universal listener (e.g., HTTP.sys, or a kernel-mode device driver that routes HTTP requests to user-mode applications). The unique identifier and the URI can then be transmitted to the server 820 in the registration message, and inserted into the listeners table 880. It is to be appreciated that generation of the unique URI can be facilitated via a second unique identifier as part of the relative URI.

A subsequent data table change invokes a trigger associated with the registered data table, and the trigger facilitates a search of the listeners table 880 for data table registration information. If a match is found, then the registration information associated with the data table is provided to the notification delivery service 890. The notification delivery service 890 employs at least a portion of the information in a message, and provides the message to the universal listener. The universal listener utilizes the relative path within the URI to route the request to the dependency listener. The dependency listener can utilize the data table registration information (e.g., the unique identifier) to notify the client 810 and/or other clients registered to receive a notification.

It is to be appreciated that employing a dependency listener and a universal listener mitigates installing and activating (e.g., launching) services such as a notification runtime service on the client application 810. In addition, employing a dependency listener and a universal listener affords for transmitting a change message and/or an invalidation notification through a firewall since port 80 can be employed. It is to be appreciated that the port can be configurable and that any port can be utilized.

Figure 9:
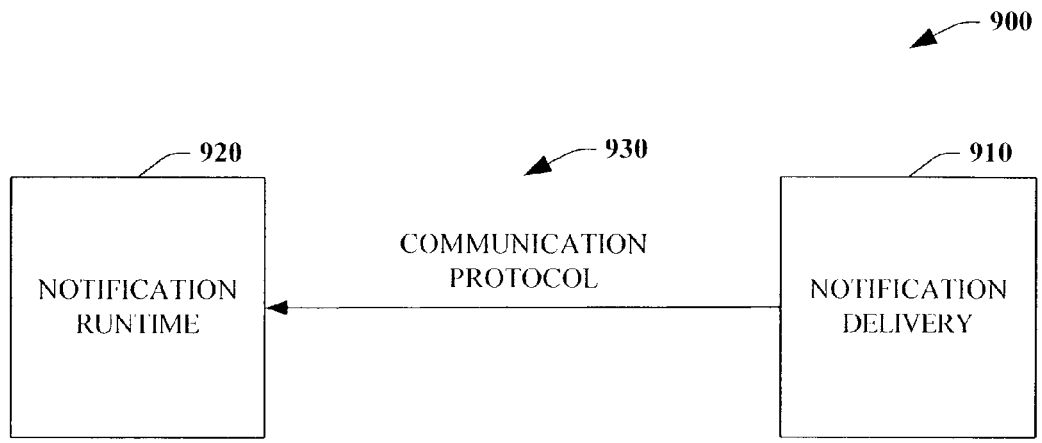
FIG. 9 illustrates a first exemplary communication protocol in accordance with one aspect of the present invention.

FIG. 9 illustrates an exemplary communication technique in accordance with an aspect of the present invention. The system 900 comprises a portion of a system such as the client-server system 800 (FIG. 8) described above. The system 900 includes a notification delivery service 910, a notification runtime service 920 and a communication protocol 930. The notification delivery service 910 and the notification runtime service 920 can be similar to the aforementioned notification delivery service and notification runtime service. The communication protocol 930 operatively couples the notification delivery service 910 and the notification runtime service 920 for the transmission of information. Suitable communication protocols include Transfer Control Protocol (TCP) and Hypertext Transfer Protocol (HTTP), for example.

Transfer Control Protocol provides a connection-oriented protocol wherein a port is established and maintained until a message is transmitted and received. Thus, when the notification delivery service 910 is employed to transmit a message, a port between the notification delivery service 910 and the notification runtime service 920 is opened. The port is typically dedicated to message transmission thereby providing high-speed, low traffic transmission. Therefore, the present invention can mitigate transmission latencies by employing a high-speed, low traffic communication protocol such as TCP, for example.

After establishing a port, the notification service 920 transmits the message via the port. Typically, TCP is employed with the Internet Protocol (IP) wherein a message is transmitted in the form of message units or packets, which facilitate high-speed, efficient routing. When employing TCP/IP, the TCP layer typically tracks individual packets transmission whereas the IP layer handles the transmission. On the client application, TCP is responsible for reassembling the packets back into the message.

Hypertext Transfer Protocol provides an open and sharable communication protocol wherein messages indicating a data table in the listeners table has changed can be transmitted, serially and/or concurrently. Unlike TCP, a port does not have to be established when the notification delivery service 910 is employed to transmit a message since the HTTP protocol is an open protocol. Thus, overhead associated with establishing and maintaining a port can be mitigated. In addition, employing HTTP provides transmission of messages through firewalls via utilizing an existing, open port (e.g. port 80), for example.

When message transmission is delayed because of high traffic over the shared protocol, the server can commit a data table change and/or delay committing a data table change until the data table change message is sent and/or received. Therefore, the present invention affords message delivery wherein committing data table changes and delivering a message indicating the data table change can transpire during different time periods (e.g., asynchronously) to mitigate delivery latency and/or during a substantially similar time period (e.g., synchronously) to mitigate data inconsistency.

Techniques for confirming an available communication to ensure a registered application can be notified when an associated data table changes include establishing a handshake between the notification delivery service 910 and the notification runtime service 920 and/or employing a push or pull model. Available communication includes 20 an active and/or running notification delivery service 910 and notification runtime service 920, and an open channel between the notification delivery service 910 and the notification runtime service 920.

In one aspect of the present invention, an acknowledgment (e.g., ACK) can be employed to indicate successful (e.g., uncorrupted and errorless) transmission. In another aspect of the present invention, an acknowledgment (e.g., a negative acknowledgment, or NAK) and/or no acknowledgment can indicate an unsuccessful transmission. In yet another aspect of the present invention, Packet Internet Groper (Ping) can be employed. For example, a dependency component can convey database information to the notification runtime service 920. Then the notification runtime service 920 can ping the notification delivery service 910. If a reply is not received, then the notification runtime service can transmit a notification indicating a data table(s) may have changed. In another example, the server, when receiving registration information, can verify that communication exists for data table change messages. If communication is not present, then the server can reject the registration information, return an error message, and/or deny future request to update the data table, for example. In still another aspect of the present invention, the notification runtime service 920 can be shut down. The notification runtime service 920 can provide a message, for example indicating data consistency can no longer be ensured, prior to shutting down.

Figure 10:
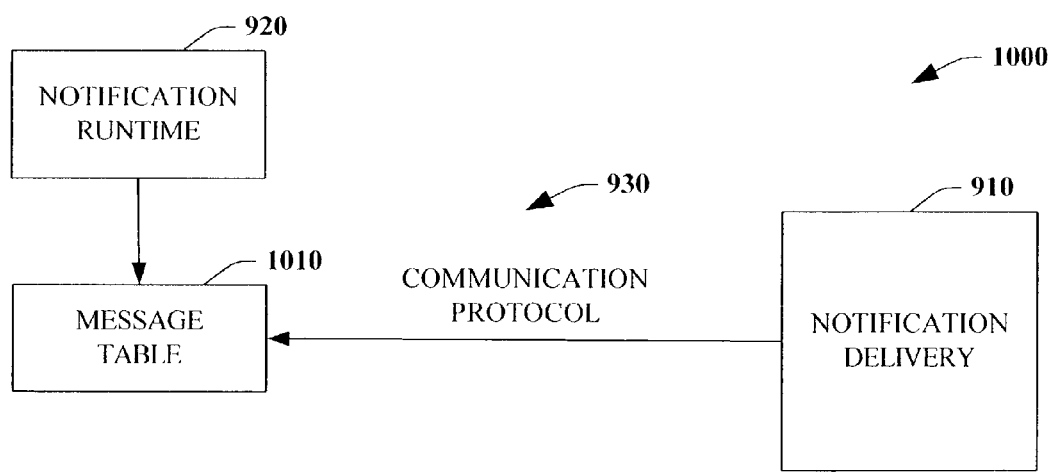
FIG. 10 illustrates a second exemplary communication protocol in accordance with one aspect of the present invention.

FIG. 10 illustrates a system 1000 that is similar to the system 900. The system 1000 comprises the notification delivery service 910, the notification runtime service 920 and the communication protocol 930. In addition, the system 1000 further comprises a message table 1010, wherein the notification delivery service 910 can transmit messages indicating data table changes to the message table 1010 and/or the notification runtime 920. Furthermore, the notification delivery service 910 can transmit a copy of at least a portion of the listeners table to the message table 1010. Thereafter, the notification runtime service 920 can employ a pull technique to scan the message table 1010 prior to employing data to ensure that the data consistent.

Figure 11:
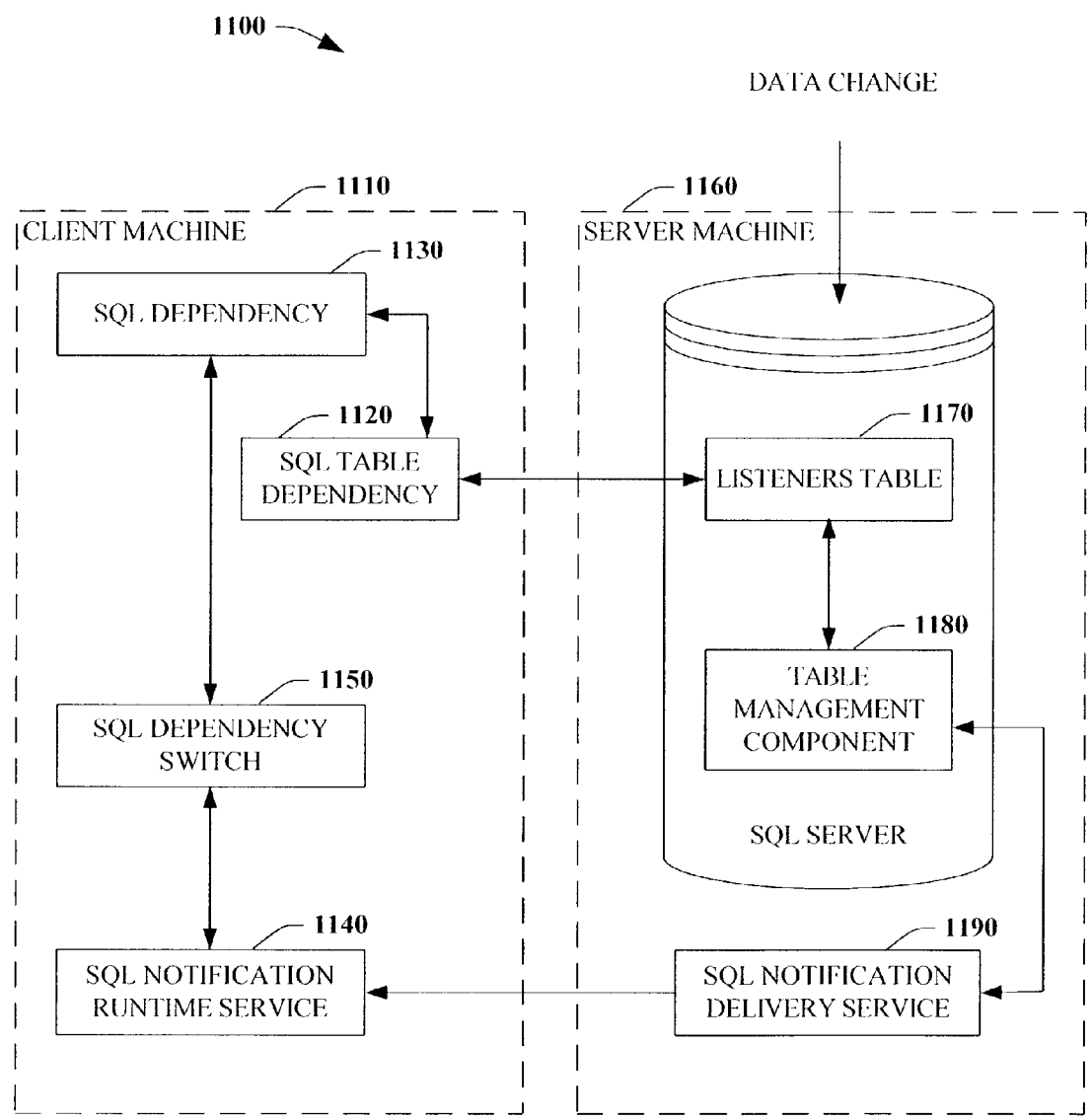
FIG. 11 illustrates a second exemplary client-server in accordance with one aspect of the present invention.

Proceeding to FIG. 11, an exemplary client-server system 1100 in accordance with an aspect of the present invention is illustrated. The client-server 1100 comprises a client machine 1110 and a server machine 1160. The client machine 1110 comprises a SQL table dependency 120, a SQL dependency 1130, a SQL notification runtime service 1140 and an SQL dependency switch 1150.

Generally, a client application instantiates the SQL table dependency 1120 (e.g., a derived object), which creates the SQL dependency 1130 (e.g., object) and a unique identifier. It is to be appreciated that a component can be instantiated that comprises both the SQL, table dependency 1120 and the SQL dependency 1130. However, component delineation facilitates re-usability of the SQL dependency component 1130 for other data table registrations, for example. When instantiating the SQL dependency (and/or the component comprising the SQL table dependency 1120 and the SQL dependency 1130), the client application provides a data table name and/or an optional connection, via a constructor and/or method.

Subsequently, the SQL dependency 1130 registers with the SQL notification runtime service 1140. According to one approach, registration occurs through the SQL dependency switch 1150. For example, if the SQL dependency switch 1150 and the SQL notification runtime service 1140 are active, the SQL dependency 1130 provides the unique identifier and registers through the dependency switch 150 with the SQL notification runtime service 1140. Employing the dependency switch 1150 mitigates cross-boundary channels, as noted supra. According to another approach, the SQL dependency 1130 registers with the SQL notification runtime service 1140 without employing a component such as the SQL dependency switch 1150, for example. The SQL notification runtime 1140 then provides a delivery address to the SQL dependency 1130.

It is to be appreciated that similar to the client application system 800, the client-server system 1100 can employ a dependency listener (not shown) and register with a universal listener (not shown) to receive a notification when a database table changes, in accordance with an aspect of the present invention. For example, after obtaining the unique identifier, the dependency listener can utilize the unique identifier to register with the universal listener, wherein a URI can be returned to the SQL dependency 1130.

The SQL table dependency 1120 can then register the data table with a server machine 1160, for example via invoking a method wherein the table name and the SQL dependency 1130 delivery address and identifier (or the URI and the unique identifier) are transmitted to a listeners table 1170.

The server machine 1160 comprises a listeners table 1170, a table management component 1180 and a SQL notification delivery service 190. The server machine 1160 can be employed to detect a data table change and provide a message indicating the data table changed for data tables that have been registered in the listeners table 1170.

For example, after a data table is registered via the client 1100, the data table registration information is added to the listeners table 1170. When a data table change 1195 is requested, a data table trigger (not shown) provides the data table name to search the listeners table 1170. If a match is in the listeners table 1170, the SQL notification delivery service 1190 is provided with the delivery address and identifier. The registration information associated with the change data table can then be removed from and/or retained in the listeners table 1170.

The SQL notification delivery service 1190 then calls the SQL notification runtime 1140 and/or universal listener, and provides the SQL, notification runtime 1140 and/or universal listener information such as the unique identifier, for example. The SQL dependency 130 is then notified that the data table changed, and subsequently notifies client applications associated with the changed data table. For example, the SQL dependency can raise an event for applications associated with the changed data table and/or set a flag to raise an event when an application attempts to associate with the changed data table.

FIGS. 12-19 illustrate methodologies in accordance with the present invention. For simplicity of explanation, the methodologies are depicted and described as a series of acts. It is to be understood and appreciated that the present invention is not limited by the acts illustrated and/or by the order of acts, for example acts can occur in various orders and/or concurrently, and with other acts not presented and described herein. Furthermore, not all illustrated acts may be required to implement a methodology in accordance with the present invention. In addition, those skilled in the art will understand and appreciate that a methodology could alternatively be represented as a series of interrelated states (e.g., state diagram) or events.

For brevity, the following description details registration, detection and notification for an application. However, it is to be appreciated that more than one application can register, and the more than one application can register with more than one data table, including similar data tables, wherein a substantially similar method can be employed for registration. Furthermore, the components and/or systems described previously can be employed with the methods presented in FIGS. 12-19. Thus, reference to a listeners table includes the listeners tables illustrated with FIGS. 1-4, 8 and 11, for example. Likewise, reference to other components (e.g., registration, detection, notification and receiving) includes the components described above.

Figure 12:
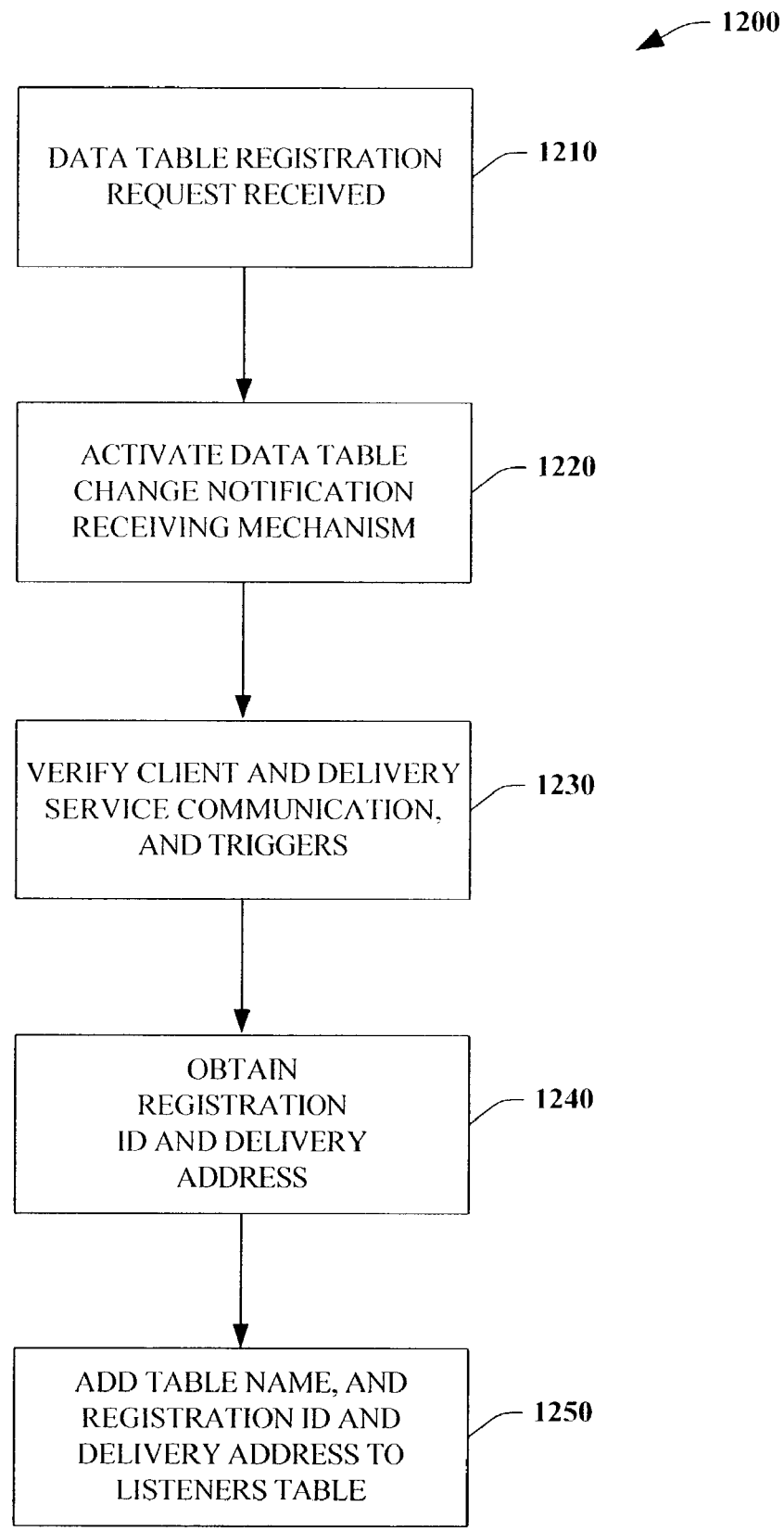
FIG. 12 illustrates an exemplary registration methodology in accordance with one aspect of the present invention.

Referring initially to FIG. 12, a registration methodology 1200 in accordance with an aspect of the present invention is illustrated. The registration methodology 1200 can be employed to register a database data table and to receive notification (e.g., an event) when the data table changes. Generally, registration includes adding parameters to a look up table (e.g., listeners table) after activating (if not already activated) a data table change message receiving mechanism (e.g., notification runtime service).

Proceeding to reference numeral 1210, a request is received to register a data table and to receive notification when the data table changes. The request typically includes the data table name and/or other information such as a database identifier. For example, a client application can query a database data table and cache the results, or store the results in a storage medium external to the database. Then, when a query that would return similar results is requested by any client, the cached data can be employed. Utilizing the cached data mitigates performing time-costly queries, especially when the data is frequently utilized. At 1220, a data table change notification receiving mechanism (e.g., notification runtime service) to receive a data table change message corresponding to the registered data table is activated. If the receiving mechanism is not active (e.g., turned off, disabled and powered down), then it is launched. Various techniques can be employed to determine the state of the receiving mechanism. For example, a data packet can be sent to the receiving mechanism wherein a reply from the receiving mechanism indicates that the receiving mechanism is active. If the receiving mechanism is not active, but available to receive a data table change message, then a data table change can be held back until the receiving mechanism is activated and/or a notification can be transmitted to indicate saved data may be inconsistent.

At 1230, diagnostics can be employed, for example, to verify a client(s) can receive notifications, a trigger(s) are installed and a message delivery component can transmit messages to a message receiving component. For example, the client can be pinged to verify an open communication channel. A reply from the client indicates that communication exists. In another example, a data packet can be sent (e.g., via the receiving mechanism) to the component (e.g., notification delivery service) delivering the data table change message. A reply from the delivery component indicates the receiving mechanism can receive messages from the delivery component.

Next, at reference numeral 1240, a registration ID and delivery address is obtained, and can be utilized to route a data table change message to the registered application. At 1250, registration information (e.g., the table name, the registration ID and/or the delivery address) is provided (e.g., as a data packet, a cookie and/or message) to a listeners table in the database, wherein at least a portion of the registration information is added to the listeners table.

Figure 13:
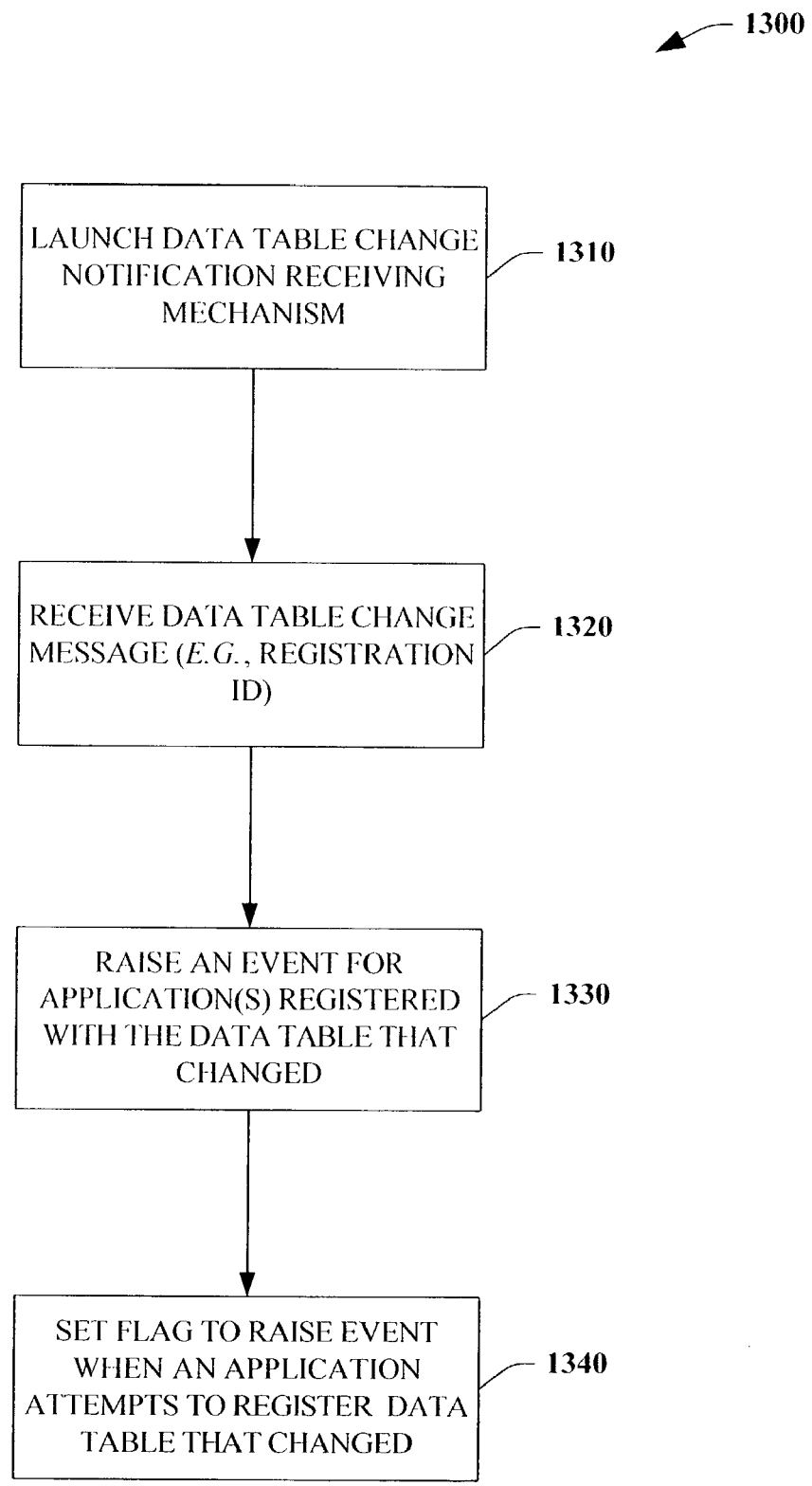
FIG. 13 illustrates an exemplary notification methodology in accordance with one aspect of the present invention.

FIG. 13 illustrates a message receiving methodology 1300 in accordance with an aspect of the present invention is illustrated. The message receiving methodology 1300 can be employed to notify an application that the data table changed. Generally, a data table change message is received that includes identification of a registered data table. An application can then be notified that the registered data table changed. For example, after a client application registers a data table, a subsequent data table change elicits a data table change message to be delivered to the receiving component. Then, an event can be raised that notifies the client application that the data table changed. The client application can then invalidate the cached data, perform a query to refresh the cached data, and/or ignore the message.

Proceeding to reference numeral 1310, a data table change notification receiving mechanism to receive a data table change message corresponding to the registered data table is launched. Generally, registering a data table initiates launching the receiving mechanism, if the receiving mechanism is not already active. Next at 1320, a data table change message for a registered data table is received. Typically, the message includes information (e.g., identification, address and name) to locate an application registered to receive notification when the registered data table changes.

At 1330, the identification or other message information is utilized to notify the client application registered to receive a notification. For example, an event can be raised that notifies the client application that the data table changed. At 1340, similar information is employed to set a flag to raise an event indicating that the data table changed when an application attempts to register the data table subsequent the data table change. In addition, an application can check the flag to determine whether a data table change has occurred.

In another aspect of the invention, the receiving mechanism and/or the data change message delivery component can be shut down (e.g., turned off and disabled) wherein prior to shut down, an event is raised for substantially all applications registered to receive a notification and/or a flag is set for subsequent attempts to register a data table. Thus the present invention provides security to mitigate employing inconsistent data when a portion of the system contributing the notification becomes inoperable, wherein a data table change notification cannot be provided to the registered client application.

Figure 14:
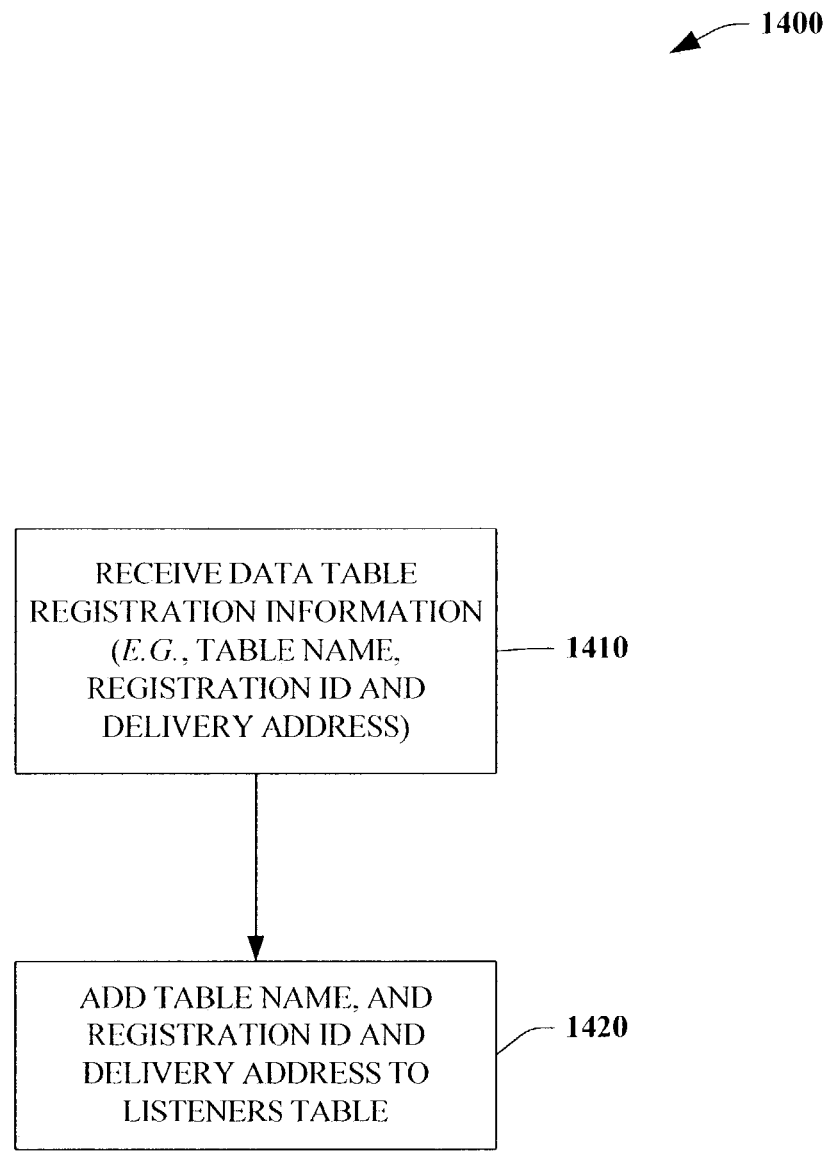
FIG. 14 illustrates an exemplary monitoring methodology in accordance with one aspect of the present invention.

FIG. 14 illustrates a monitoring methodology 1400 in accordance with an aspect of the present invention. The monitoring methodology 1400 can be employed to add registered data table information to a table utilized to notify applications that a data table changed. Generally, registration information is received and stored in a table that can be searched when a data table changes. If matching data table registration information is included in the table, then the stored registration information is employed to notify applications registered to receive notification that the data table changed.

At 1410, data table registration information is received. Registration information can include a registration ID, a delivery address and a table name, for example. At 1420, the registration information is added to a listeners table. The listeners table can be employed to indicate that a data table is registered. For example, when a data table changes, a trigger associated with the data table can invoke a search of the listeners table to determine if the data table that changed is in the listeners table. If the data table is in the listeners table, the stored registration information can be provided to a delivery component, which sends a message indicating a registered data table has changed.

Figure 15:
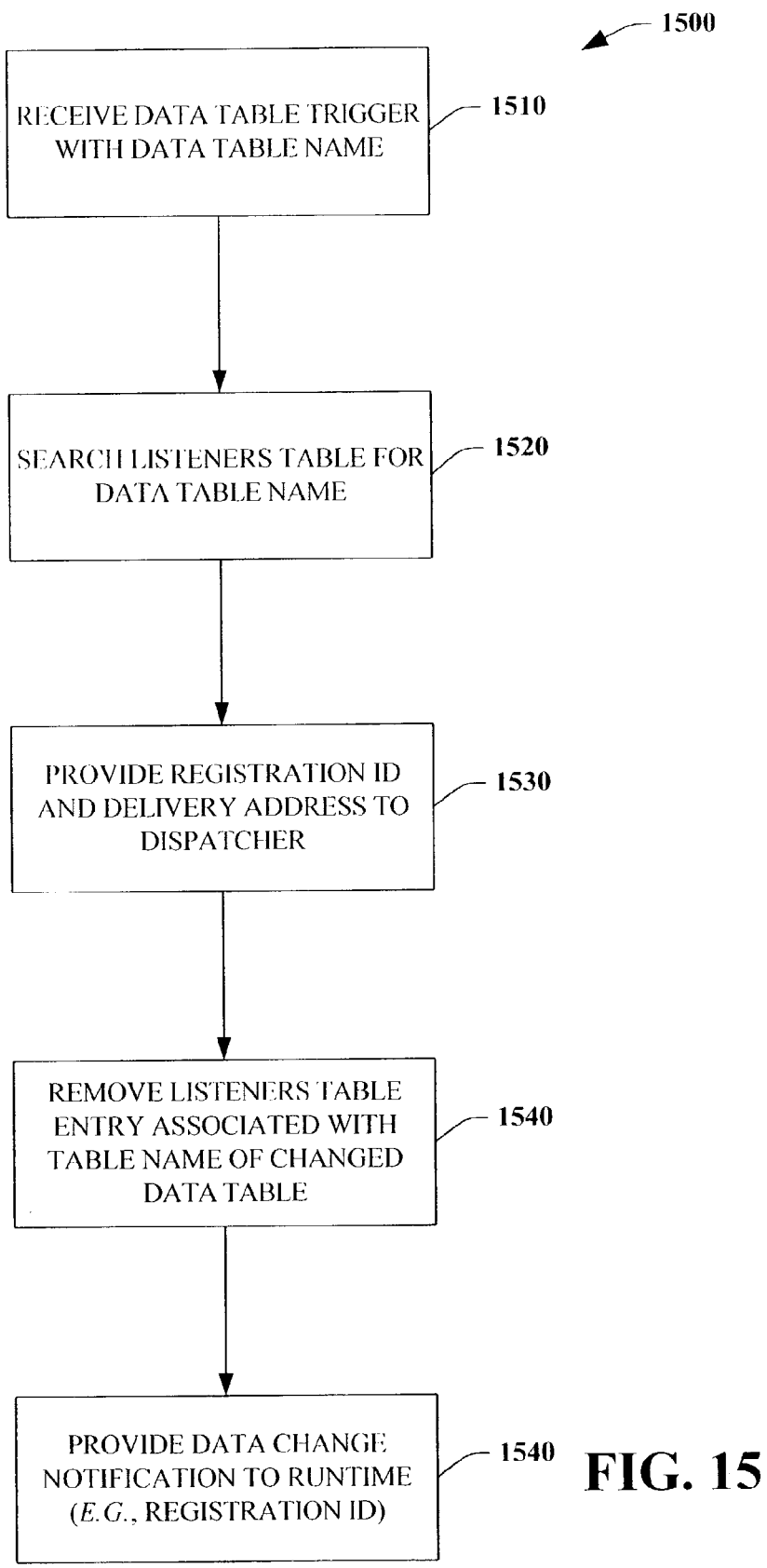
FIG. 15 illustrates an exemplary detecting and delivery methodology in accordance with one aspect of the present invention.

FIG. 15 illustrates a detection and delivery methodology 1500 in accordance with an aspect of the present invention is illustrated. The detection and delivery methodology 1500 can be employed to determine if a changed data table is registered and to transmit a data table change message. Generally, when a data table changes, a table of registered data tables is search for associated data table registration information. If a match is located, then the stored registration information is employed in a message transmitted to notify applications registered to receive a notification that the data table changed.

Beginning at 1510, a data table change occurs which invokes a trigger associated with the data table. At 1520, the trigger elicits a search of a listeners table for an entry(ies) associated with the data table that changed. Typically, the table name is employed in the search. However, the table name and/or other identifiers can be employed. At 1530, the registration information in the listeners table is provided to a data table changed message delivery component (e.g. notification delivery service). It is to be appreciated that multiple clients can register a substantially similar data base table, and therefore multiple entries associated with the changed data table may be located in the listeners table and conveyed to the message delivery component.

Proceeding to 1530, the registration information can then be removed from and/or retained in the listeners table. If the registration information is removed, then a search of the listeners table for a subsequent data table change will not provide a matching data table. However, a client application can subsequently re-register the data table to be notified when the next data table change occurs. In another aspect of the present invention, the registration information may be retained subsequent to a future request to unregister the change and/or a timeout expires. Furthermore, the option of whether the registration information is removed may be configurable and/or specified as part of the registration information.

At 1540, the notification delivery service transmits a message with at least a portion of the registration information to a data change message receiving component (e.g., notification runtime service). Typically, the registration ID is transmitted in the message. For example, an object ID can be transmitted, wherein an event is raised and a flag is set for application object instances. In addition, other information such as the type of data base change (e.g., insert, update and delete) and/or reason for notification (e.g., data changed, time out expired, memory full and system boot) as well as content (e.g., original and current values) can be transmitted.

Figure 16:
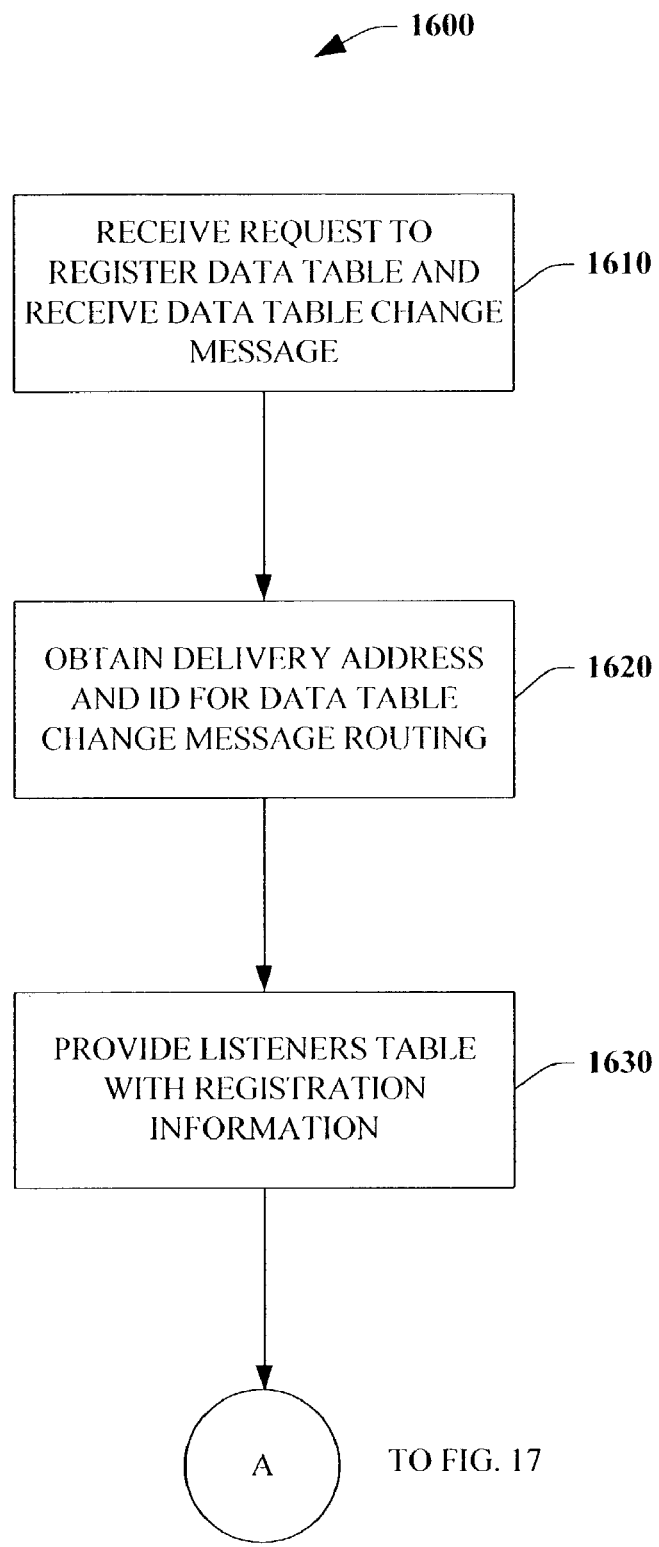
FIG. 16 illustrates a first exemplary registration, detection, dispatching and notification methodology in accordance with one aspect of the present invention.
Figure 17:
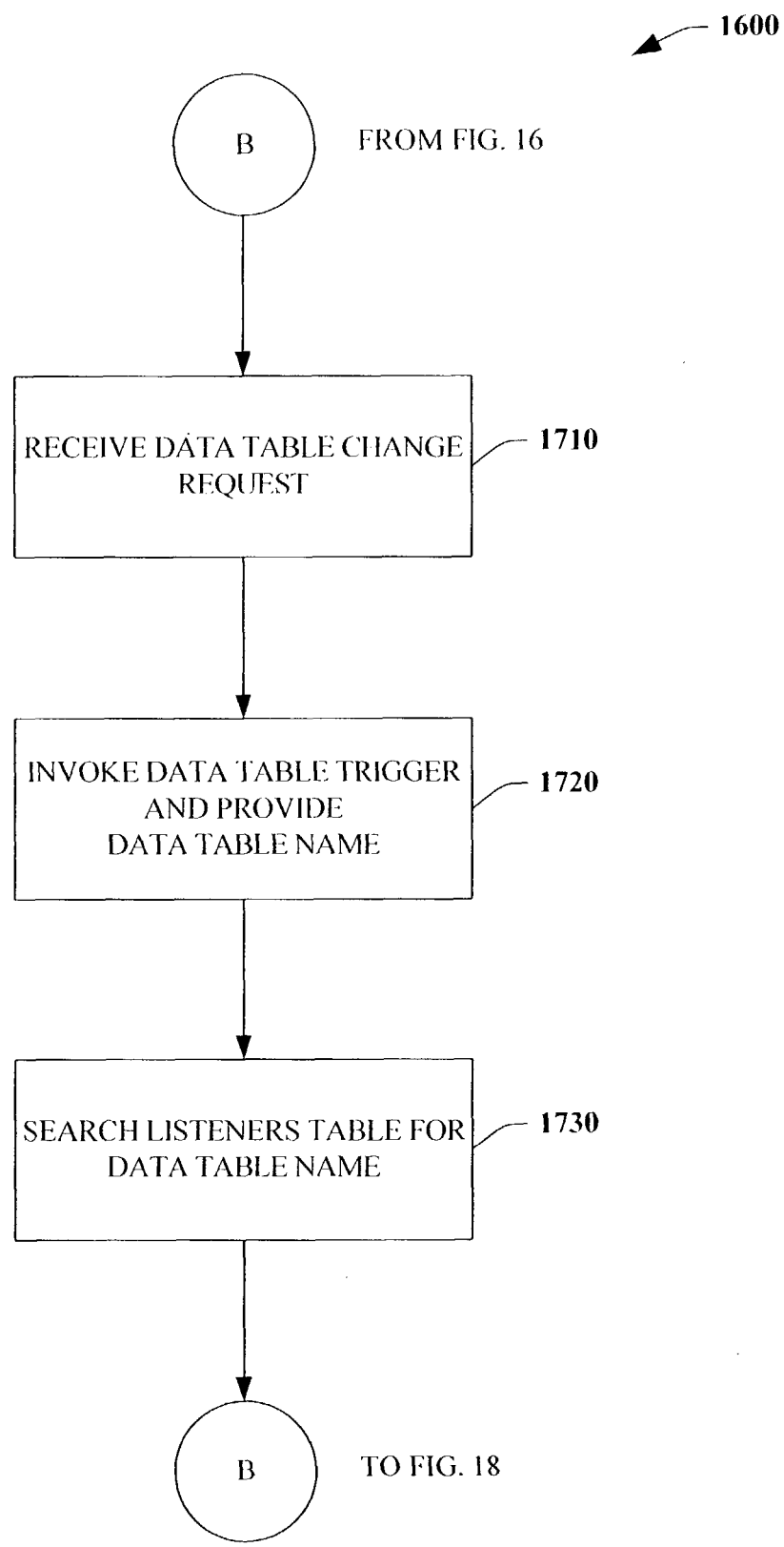
FIG. 17 is a continuation of FIG. 16 in accordance with one aspect of the present invention.
Figure 18:
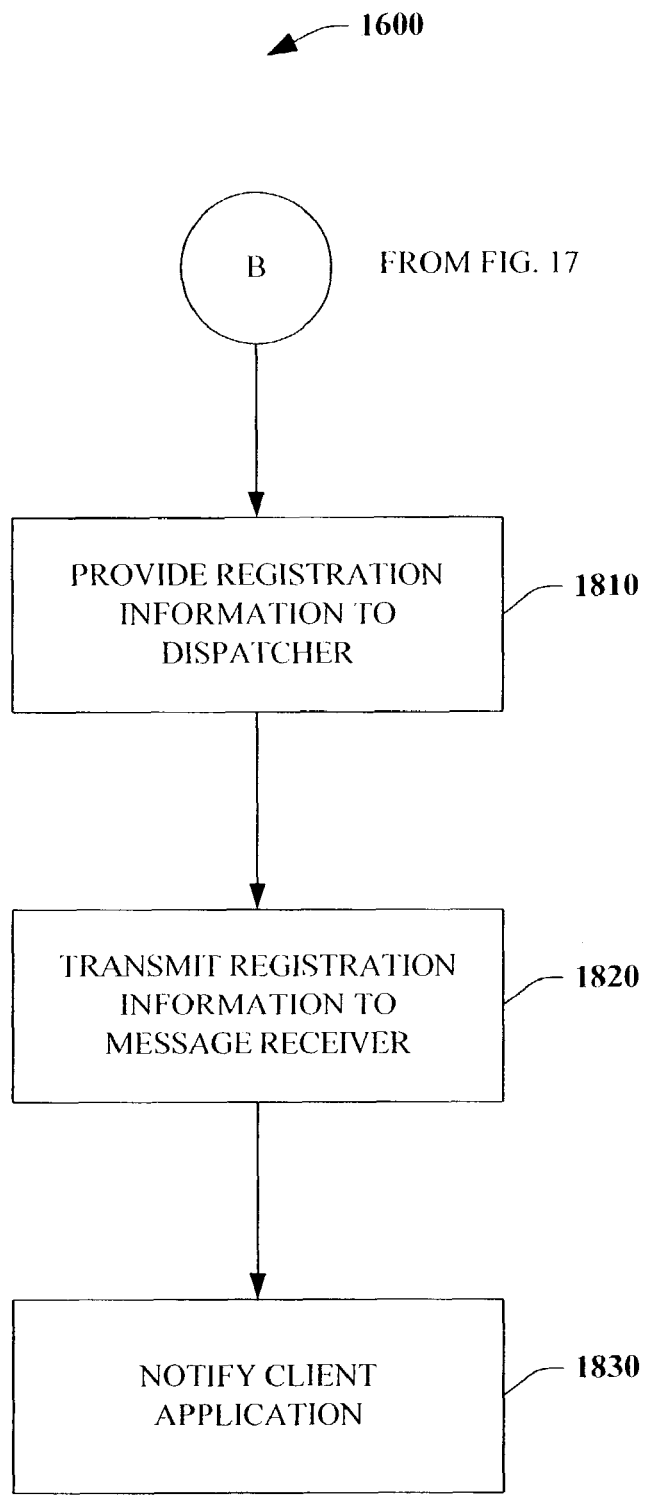
FIG. 18 is a continuation of FIG. 17 in accordance with one aspect of the present invention.

FIGS. 16-18 illustrate methodology 1600 to register, detect and receive notification that a database data table changed in accordance with an aspect of the present invention. Proceeding to FIG. 1600, at reference numeral 1610 a client application requests to register a database data table and to receive a notification when the data table changes, wherein the client application provides at least a data table name, for example. At 1620, a delivery address and an identification are obtained for routing a data table change message to the client application when the data table changes. At 1630, registration information including the table name, the delivery address and the identification is provided to the listeners table. The registration information is added to the listeners table.

Moving to FIG. 1700, a continuation of FIG. 16 in accordance with an aspect of the present invention is illustrated. At reference numeral 1710, a data table change request is received. At 1720, the data table change request invokes a trigger associated with the data table, wherein the trigger facilitates a search of the listeners table with the data table name. At 1730, the listeners table is searched for the data table name.

Next at FIG. 18, a continuation of FIG. 17 in accordance with an aspect of the present invention is illustrated. At 1810, the registration information stored in the listeners table corresponding to the data table name is provided to a notification delivery service (e.g., notification delivery service). Subsequently, the registration information provided to the notification delivery service can be removed from and/or retained in the listeners table, as described supra. At 1820t the notification delivery service transmits a message to the data table change receiver, wherein the message at least includes the identification information. At 1830, a client registered to receive notification is notified.

Figure 19:
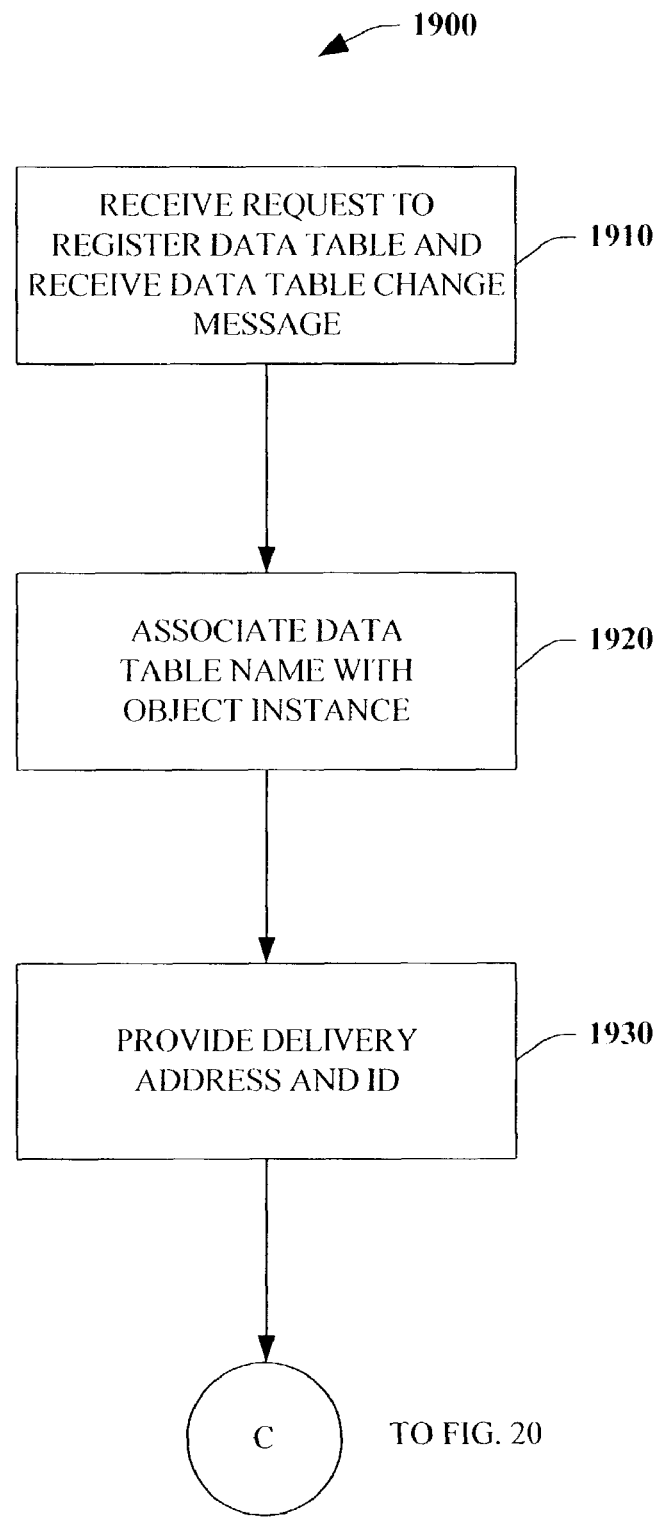
FIG. 19 illustrates a second exemplary registration, detection, dispatching and notification methodology in accordance with one aspect of the present invention.
Figure 20:
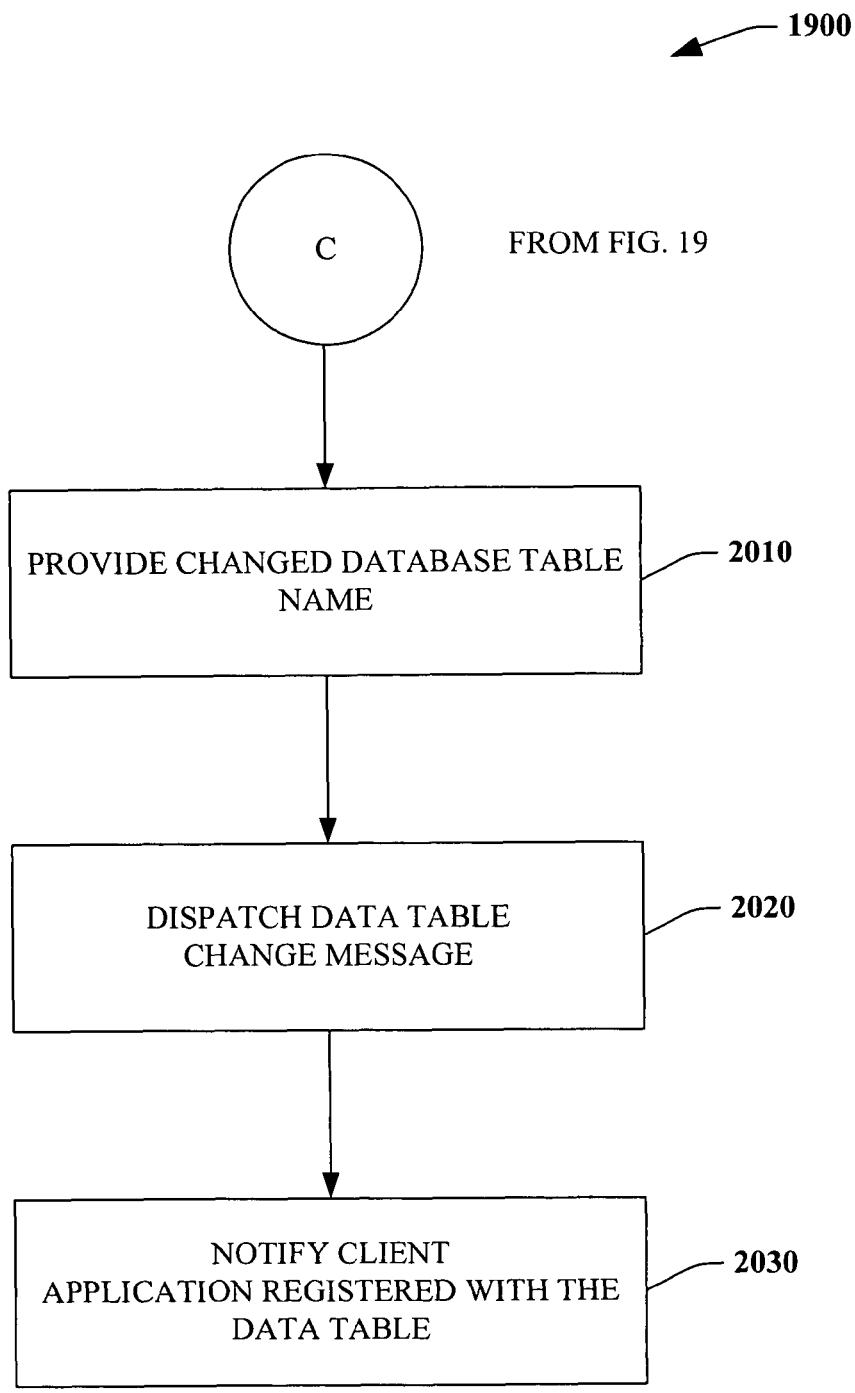
FIG. 20 is a continuation of FIG. 19 in accordance with one aspect of the present invention.

FIGS. 19-20 illustrate methodology 1900 to register, detect and receive notification that a database data table changed in accordance with an aspect of the present invention. Proceeding to FIG. 1900, at reference numeral 1910 a client application requests to register a database data table, wherein a change to the data table will invoke a notification to the client application that the data table chanced. At 1920, the data table is associated with an object instance. For example, any base class providing methods and members for delivery and eventing can be employed.

Association typically comprises providing the table name and connection to the object instance. For example, the table name and/or connection can be provided via a constructor. Furthermore, the constructor can instantiate a derived object, for example an object derived from the base class. Likewise, the table name and/or connection can be provided via a constructor. Additionally, the table name and/or connection can be provided through a method call.

Instantiation of the object can create a unique identifier such as a Global Unique Identifier, or GUID. The object can then register with a notification runtime service, including through an optional dependency switch. At reference numeral 1930, the delivery address and identity of the base class are provided by the notification runtime service. For example, the derived object can facilitate passing the delivery address and identity of the base object which are then inserted, along with the table name, in a listeners table (e.g., described supra). After a data table change is requested, a trigger associated with the data table can be invoked. The trigger can call a routine (e.g., a stored procedure) which can be associated with one or more data tables wherein the trigger provides information to discern the data table name of the data table changed.

Moving to FIG. 20, a continuation of FIG. 19 in accordance with an aspect of the present invention is illustrated. At reference numeral 2010, the data table name of the data table that changed is provided and facilitates a search of the entries in the listeners table. If the data table name is in the listeners table, the registration information is provided to the notification delivery service.

It is noted that the request to change data can be committed and/or held back until the client is notified of the data table change. For example, in one aspect of the present invention, an asynchronous model can be employed wherein a data table change is committed wherein committing the data table change is not synchronized with providing a data table change notification or event. An asynchronous model affords scalability. In another aspect of the present invention, a synchronous model can be employed wherein a data table change is committed when synchronized with providing a data table change notification or event. A synchronous model affords reliability.

At 2020, a data table change message is transmitted from the notification delivery service, passing the identity of the base object. The communication protocol employed to transmit the message between the notification delivery service and the notification runtime service can be any data communication protocol known. For example, in one aspect of the present invention. Transfer Control Protocol (TCP) and/or Hypertext Transfer Protocol (HTTP), as described above, can be employed. Transfer Control Protocol affords a high-speed communication path via mitigating sharing the communication path with register requests. Hypertext Transfer Protocol affords reduced overhead via utilizing an existing open port (e.g., port 80).

Techniques such as handshaking and polling can be employed. For example, in one aspect of the present invention, the notification delivery service and notification runtime service establish a handshake or heartbeat, wherein the notification delivery service and/or notification runtime service can ping to ensure communication between the notification delivery service and notification runtime service. Both an asynchronous and synchronous model can be employed wherein a data table change is committed or blocked until the data table change and notification are synchronized.

In another aspect of the present invention, a data table change is blocked until the notification delivery service ensures communication between the notification delivery service and notification runtime service via polling the notification runtime service after receiving a data table change request. In yet another aspect, the data table change message and/or listeners table is stored external the database, wherein the client application scans the external storage area to determine if a data table changed. In still another aspect of the present invention, the client does not utilize saved results until communication can be verified.

Furthermore, reliability can be provided to mitigate a loss of communication between the notification delivery service and the notification runtime service. For example, in an aspect of the present invention, when communication between the notification delivery service and the notification runtime service is lost, the notification runtime service notifies substantially all applications that any stored data is inconsistent with the database. The notification mitigates utilizing inconsistent data when the client application is unable to receive a data table change notification. In another aspect of the invention, the notification runtime service notifies substantially all applications that any stored data is inconsistent with the database prior to the notification runtime service shutting down. Likewise, the notification mitigates utilizing inconsistent data when the client application is unable to receive a data table change notification. It is to be appreciated that registering a dependency (as described herein) with the notification runtime service affords the notification runtime service a means to transmit the notification to applications.

At 2030, the client application is notified that the registered data table changed. For example, in one aspect of the present invention an event is raised indicating the data table change for the client application registered through the derived object. After the data table changes, a flag is set in the dependency object signifying the data table change to mitigate client applications attempting to register the data table. The flag, for example, can raise the event when a client applications attempts to register the data table.

Figure 21:
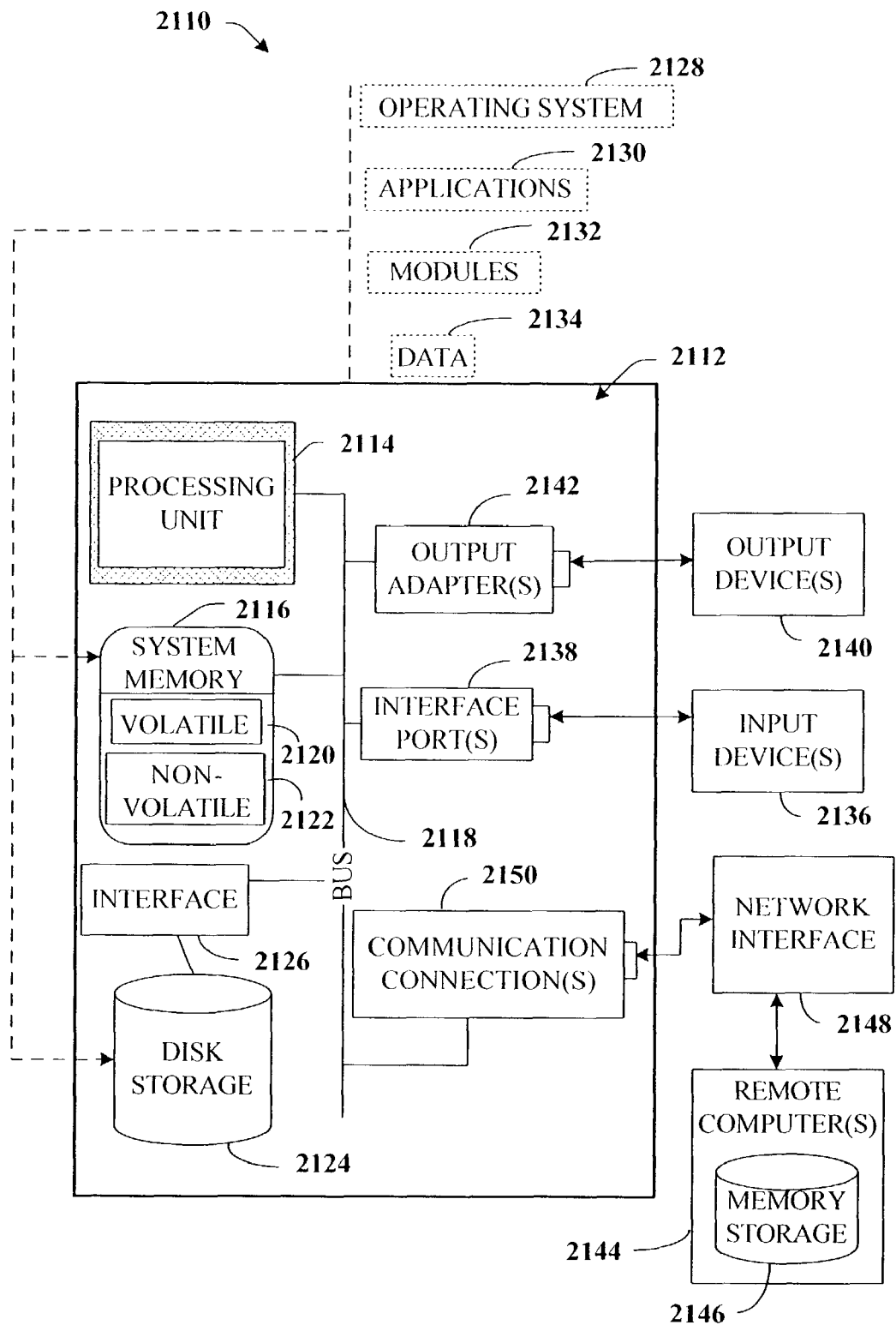
FIG. 21 illustrates an exemplary operating system in accordance with one aspect of the present invention.

In order to provide additional context for various aspects of the present invention, FIG. 21 and the following discussion are intended to provide a brief, general description of a suitable operating environment 2110 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software. Generally, however, program modules include routines, programs, objects, components, data structures, etc. that perform particular tasks or implement particular data types. The operating environment 2110 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 21, an exemplary environment 2110 for implementing various aspects of the invention includes a computer 2112. The computer 2112 includes a processing unit 2114, a system memory 2116, and a system bus 218. The system bus 2118 couples system components including, but not limited to, the system memory 2116 to the processing unit 2114. The processing unit 2114 can be any of various available processors. Dual microprocessors and other multiprocessor architectures also can be employed as the processing unit 2114.

The system bus 2118 can be any of several types of bus structure(s) including the memory bus or memory controller, a peripheral bus or external bus, and/or a local bus using any variety of available bus architectures including, but not limited to, an 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card international Association bus (PCM-CIA), and Small Computer Systems Interface (SCSI).

The system memory 216 includes volatile memory 2120 and nonvolatile memory 2122. The basic input/output system (BIOS), containing the basic routines to transfer information between elements within the computer 2112, such as during start-up, is stored in nonvolatile memory 2122. By way of illustration, and not limitation, nonvolatile memory 2122 can include read only memory (ROM), programmable ROM (PROM), electrically programmable ROM (EPROM), electrically erasable ROM (EEPROM), or flash memory. Volatile memory 2120 includes random access memory (RAM), which acts as external cache memory. By way of illustration and not limitations RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 2112 also includes removable/nonremovable, volatile/nonvolatile computer storage media. FIG. 21 illustrates, for example a disk storage 2124. Disk storage 2124 includes, but is not limited to, devices like a magnetic disk drive, floppy disk drive, tape drive, Jaz drive, Zip drive, LS-100 drive, flash memory card, or memory stick. In addition, disk storage 2124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 2124 to the system bus 2118, a removable or non-removable interface is typically used such as interface 2126.

It is to be appreciated that FIG. 21 describes software that acts as an intermediary between users and the basic computer resources described in suitable operating environment 2110. Such software includes an operating system 2128. Operating system 2128, which can be stored on disk storage 2124, acts to control and allocate resources of the computer system 2112. System applications 2130 take advantage of the management of resources by operating system 2128 through program modules 2132 and program data 2134 stored either in system memory 2116 or on disk storage 2124. It is to be appreciated that the present invention can be implemented with various operating systems or combinations of operating systems.

A user enters commands or information into the computer 2112 through input device(s) 2136. Input devices 2136 include, but are not limited to, a pointing device such as a mouse, trackball, stylus, touch pad, keyboard, microphone, joystick, game pad, satellite dish, scanner. TV tuner card, digital camera, digital video camera, web camera, and the like. These and other input devices connect to the processing unit 2114 through the system bus 2118 via interlace port(s) 2138. Interface port(s) 2138 include, for example, a serial port, a parallel port, a game port, and a universal serial bus (USB). Output device(s) 2140 use some of the same type of ports as input device(s) 2136. Thus, for example, a USB port may be used to provide input to computer 2112, and to output information from computer 2112 to an output device 2140. Output adapter 2142 is provided to illustrate that there are some output devices 2140 like monitors, speakers, and printers among other output devices 2140 that require special adapters. The output adapters 2142 include, by way of illustration and not limitation, video and sound cards that provide a means of connection between the output device 2140 and the system bus 2118. It should be noted that other devices and/or systems of devices provide both input and output capabilities such as remote computer(s) 2144.

Computer 2112 can operate in a networked environment using logical connections to one or more remote computers, such as remote computer(s) 2144. The remote computer(s) 2144 can be a personal computer, a server, a router. a network PC, a workstation, a microprocessor based appliance, a peer device or other common network node and the like, and typically includes many or all of the elements described relative to computer 2112. For purposes of brevity, only a memory storage device 2146 is illustrated with remote computer(s) 2144. Remote computer(s) 2144 is logically connected to computer 2112 through a network interface 2148 and then physically connected via communication connection 2150. Network interface 2148 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 2150 refers to the hardware/software employed to connect the network interface 2148 to the bus 2118. While communication connection 2150 is shown for illustrative clarity inside computer 2112, it can also be external to computer 2112. The hardware/software necessary for connection to the network interlace 2148 includes, for exemplary purposes only, internal and external technologies such as, modems including regular telephone grade modems, cable modems and DSL, modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A client-server system, including a processing unit and system memory, that detects a change in a registered database on the server and notifies a client application on the client of the change, comprising:

a client comprising:
  a first client application that instantiates a table dependency object having a unique identifier and specifying a first database table of one or more database tables on the server, the table dependency object being associated with a dependency object;
  the dependency object that registers with a notification runtime service by providing the unique identifier of the table dependency object, and that notifies the first client application of changes to the first database table; and
  the notification runtime service that, in response to the registration, provides a delivery address to the dependency object, and in response to receiving notifications of changes to a database table, notifies the appropriate dependency object of the change;
  wherein the dependency object uses the table dependency object to register the first client application to receive notification of changes to the first database table by providing the first database table name, the unique identifier, and the delivery address to a listeners table;
a server comprising:
  the listeners table that stores registration information representing client applications that are registered to receive notifications of changes to the one or more database tables, wherein the registration information includes an entry for the first client application including the first database table name, the unique identifier, and the deliver address;
  the one or more database tables;
  a trigger that is invoked in response to a change that occurs to the first database table of the one or more database tables, the trigger providing the name of the first database table that was changed to the listeners table, wherein upon receiving the name, the listeners table searches the registration information to locate any entries that include the name of the first database table, and upon locating the entry corresponding to the first client application, notifies a notification delivery service by providing the corresponding unique identifier and delivery address of the located entry;
  the notification delivery service that, upon receiving the corresponding unique identifier and delivery address of the located entry, notifies the notification runtime service of the change to the first database table by sending the unique identifier to the delivery address.

2. The system of claim 1, wherein the registration information further comprises at least one of an authentication mode, and a command to call the notification delivery service.

3. The system of claim 1, wherein the listeners table comprises storage space in one of a multi-dimensional matrix, an array, a record or a structure.

4. The system of claim 1, wherein the listeners table comprises fields that includes a database table identification field and at least one client application identification field.

5. The system of claim 4, wherein the fields further comprise sub-fields that include a database table name, a delivery address and a registration identification sub-field.

6. The system of claim 5, wherein the sub-fields comprise registration information stored in at least one of row-wise and column-wise.

7. The system of claim 1, wherein the one or more database tables are SQL database tables.

8. The system of claim 1, further comprising a table management component that operatively couples the listeners table and the one or more database tables.

9. The system of claim 8, wherein the name of the first database table is provided by the trigger to the table management component.

10. The system of claim 9, wherein an identifier of the first database table is also provided to the table management component with the name.

11. The system of claim 1, further comprising one or more additional triggers and at least one table management component, wherein each additional trigger is tied to one of the one or more database tables and wherein each trigger calls the at least one table management component, in response to a change to the database table to which it is tied, to provide the name of the changed database table.

12. The system of claim 9, wherein the table management component initiates the search of the listeners table.

13. The system of claim 8, wherein the table management component is a database procedure.

14. The system of claim 8, wherein the table management component removes the entry corresponding to the first client application from the registration information in the listeners table after locating the entry.

15. The system of claim 1, wherein the listeners table retains the entry corresponding to the first client application in the registration information until one of the first client application removes the entry, a timeout expires, or an event occurs.

16. The system of claim 1, wherein the notification delivery service also sends at least one of a type of database change, a reason for the notification, original values, or current values to the notification runtime service.

17. The system of claim 1, wherein the first client application caches data from the first database table in main memory prior to receiving notification of the change to the first database table, and, upon receiving the notification of the change to the first database table, the first client application discards the cached data.

18. The system of claim 17, wherein the first client application, after discarding the cached data, queries the first database table for current data and caches the current data.

19. The system of claim 1, wherein the dependency object starts the notification runtime service prior to registering with the notification runtime service.

20. The system of claim 1, wherein the notification runtime service is operatively coupled to the notification delivery service through a communications protocol.

21. The system of claim 20, wherein the communications protocol employs one of Transfer Control Protocol (TCP) and Hypertext Transfer Protocol (HTTP).

22. The system of claim 1, further comprising a dependency switch through which the dependency object registers with the notification runtime service.

23. The system of claim 22, wherein the dependency switch mitigates the number of cross-boundary channels.

24. The system of claim 22, wherein the dependency switch is activated by the dependency object.

25. A method performed in a client-server system for registering for notifications of changes to a database and receiving notifications of the changes, the method comprising:
  a first client application, running on the client, instantiating a table dependency object having a unique identifier and specifying a first database table of one or more database tables on the server, the table dependency object being associated with a dependency object;
  the dependency object registering with a notification runtime service, on the client, by providing the unique identifier of the table dependency object;

the notification runtime service, in response to the registration, providing a delivery address to the dependency object;

the dependency object using the table dependency object to register the first client application to receive notification of changes to the first database table by providing the first database table name, the unique identifier, and the delivery address to a listeners table on the server;

the listeners table, which stores registration information representing client applications that are registered to receive notifications of changes to the one or more database tables, storing an entry for the first client application including the first database table name, the unique identifier, and the deliver address;

receiving a change to the first database table;

in response to the change to the first database table, invoking a trigger that provides the name of the first database table to the listeners table;

upon receiving the name, the listeners table searching the registration information to locate any entries that include the name of the first database table, and upon locating the entry corresponding to the first client application, notifying a notification delivery service on the server by providing the corresponding unique identifier and delivery address of the located entry;

the notification delivery service, upon receiving the corresponding unique identifier and delivery address of the located entry, notifying the notification runtime service on the client of the change to the first database table by sending the unique identifier to the delivery address;

the notification runtime service, in response to receiving the notification of the change to the first database table, notifying the dependency object of the change; and the dependency object notifying the first client application of the change to the first database table.

26. The method of claim 25, wherein the registration information further comprises at least one of an authentication mode, and a command to call the notification delivery service.

27. The method of claim 25, wherein the listeners table comprises storage space in one of a multi-dimensional matrix, an array, a record or a structure.

28. The method of claim 25, wherein the listeners table comprises fields that includes a database table identification field and at least one client application identification field.

29. The method of claim 28, wherein the fields further comprise sub-fields that include a database table name, a delivery address and a registration identification sub-field.

30. The method of claim 29, wherein the sub-fields comprise registration information stored in at least one of row-wise and column-wise.

31. The method of claim 25, wherein the one or more database tables are SQL database tables.

32. The method of claim 25, wherein providing the name of the first database table to the listeners table comprises providing the name to a table management component that operatively couples the listeners table to the one or more database tables.

33. The method of claim 32, wherein the name of the first database table is provided by the trigger to the table management component.

34. The method of claim 33, wherein an identifier of the first database table is also provided to the table management component with the name.

35. The method of claim 25, further comprising in response to changes to one or more additional database tables, invoking one or more additional triggers, wherein each additional trigger is tied to one of the one or more database tables and wherein each trigger calls the at least one table management component, in response to a change to the database table to which it is tied, to provide the name of the changed database table.

36. The method of claim 33, wherein the table management component initiates the search of the listeners table.

37. The method of claim 32, wherein the table management component is a database procedure.

38. The method of claim 32, wherein the table management component removes the entry corresponding to the first client application from the registration information in the listeners table after locating the entry.

39. The method of claim 25, wherein the listeners table retains the entry corresponding to the first client application in the registration information until one of the first client application removes the entry, a timeout expires, or an event occurs.

40. The method of claim 25, wherein the notification delivery service also sends at least one of a type of database change, a reason for the notification, original values, or current values to the notification runtime service.

41. The method of claim 25, wherein the first client application caches data from the first database table in main memory prior to receiving notification of the change to the first database table, and, upon receiving the notification of the change to the first database table, the first client application discards the cached data.

42. The method of claim 40, wherein the first client application, after discarding the cached data, queries the first database table for current data and caches the current data.

43. The method of claim 25, wherein the dependency object starts the notification runtime service prior to registering with the notification runtime service.

44. The method of claim 25, wherein the notification runtime service is operatively coupled to the notification delivery service through a communications protocol.

45. The method of claim 44, wherein the communications protocol employs one of Transfer Control Protocol (TCP) and Hypertext Transfer Protocol (HTTP).

46. The method of claim 25, wherein the dependency object registers with the notification runtime service through a dependency switch.

47. The method of claim 46, wherein the dependency switch mitigates the number of cross-boundary channels.

48. The method of claim 46, wherein the dependency switch is activated by the dependency object.

49. One or more non-transitory computer storage media storing computer executable instructions which when executed by one or more processors in a client-server system perform a method for registering for notifications of changes to a database and receiving notifications of the changes, the method comprising:

a first client application, running on the client, instantiating a table dependency object having a unique identifier and specifying a first database table of one or more database tables on the server, the table dependency object being associated with a dependency object;

the dependency object registering with a notification runtime service, on the client, by providing the unique identifier of the table dependency object;

the notification runtime service, in response to the registration, providing a delivery address to the dependency object;

the dependency object using the table dependency object to register the first client application to receive notification of changes to the first database table by providing the first database table name, the unique identifier, and the delivery address to a listeners table on the server;

the listeners table, which stores registration information representing client applications that are registered to receive notifications of changes to the one or more database tables, storing an entry for the first client application including the first database table name, the unique identifier, and the deliver address;

receiving a change to the first database table;

in response to the change to the first database table, invoking a trigger that provides the name of the first database table to the listeners table;

upon receiving the name, the listeners table searching the registration information to locate any entries that include the name of the first database table, and upon locating the entry corresponding to the first client application, notifying a notification delivery service on the server by providing the corresponding unique identifier and delivery address of the located entry;

the notification delivery service, upon receiving the corresponding unique identifier and delivery address of the located entry, notifying the notification runtime service on the client of the change to the first database table by sending the unique identifier to the delivery address;

the notification runtime service, in response to receiving the notification of the change to the first database table, notifying the dependency object of the change; and the dependency object notifying the first client application of the change to the first database table.

50. The one or more computer storage media of claim 49, wherein the registration information further comprises at least one of an authentication mode, and a command to call the notification delivery service.

51. The one or more computer storage media of claim 49, wherein the listeners table comprises storage space in one of a multi-dimensional matrix, an array, a record or a structure.

52. The one or more computer storage media of claim 49, wherein the listeners table comprises fields that includes a database table identification field and at least one client application identification field.

53. The one or more computer storage media of claim 52, wherein the fields further comprise sub-fields that include a database table name, a delivery address and a registration identification sub-field.

54. The one or more computer storage media of claim 53, wherein the sub-fields comprise registration information stored in at least one of row-wise and column-wise.

55. The one or more computer storage media of claim 49, wherein the one or more database tables are SQL database tables.

56. The one or more computer storage media of claim 49, wherein providing the name of the first database table to the listeners table comprises providing the name to a table management component that operatively couples the listeners table to the one or more database tables.

57. The one or more computer storage media of claim 56, wherein the name of the first database table is provided by the trigger to the table management component.

58. The one or more computer storage media of claim 57, wherein an identifier of the first database table is also provided to the table management component with the name.

59. The one or more computer storage media of claim 49, further comprising in response to changes to one or more additional database tables, invoking one or more additional triggers, wherein each additional trigger is tied to one of the one or more database tables and wherein each trigger calls the at least one table management component, in response to a change to the database table to which it is tied, to provide the name of the changed database table.

60. The one or more computer storage media of claim 57, wherein the table management component initiates the search of the listeners table.

61. The one or more computer storage media of claim 56, wherein the table management component is a database procedure.

62. The one or more computer storage media of claim 56, wherein the table management component removes the entry corresponding to the first client application from the registration information in the listeners table after locating the entry.

63. The one or more computer storage media of claim 49, wherein the listeners table retains the entry corresponding to the first client application in the registration information until one of the first client application removes the entry, a timeout expires, or an event occurs.

64. The one or more computer storage media of claim 49, wherein the notification delivery service also sends at least one of a type of database change, a reason for the notification, original values, or current values to the notification runtime service.

65. The one or more computer storage media of claim 49, wherein the first client application caches data from the first database table in main memory prior to receiving notification of the change to the first database table, and, upon receiving the notification of the change to the first database table, the first client application discards the cached data.

66. The one or more computer storage media of claim 64, wherein the first client application, after discarding the cached data, queries the first database table for current data and caches the current data.

67. The one or more computer storage media of claim 49, wherein the dependency object starts the notification runtime service prior to registering with the notification runtime service.

68. The one or more computer storage media of claim 49, wherein the notification runtime service is operatively coupled to the notification delivery service through a communications protocol.

69. The one or more computer storage media of claim 68, wherein the communications protocol employs one of Transfer Control Protocol (TCP) and Hypertext Transfer Protocol (HTTP).

70. The one or more computer storage media of claim 49, wherein the dependency object registers with the notification runtime service through a dependency switch.

71. The one or more computer storage media of claim 70, wherein the dependency switch mitigates the number of cross-boundary channels.

72. The one or more computer storage media of claim 70, wherein the dependency switch is activated by the dependency object.

* * * * *